US011254258B2

(12) United States Patent
Tatara et al.

(10) Patent No.: US 11,254,258 B2
(45) Date of Patent: Feb. 22, 2022

(54) VEHICLE COMPONENT, AND VEHICLE

(71) Applicant: KOITO MANUFACTURING CO., LTD., Tokyo (JP)

(72) Inventors: Naoki Tatara, Shizuoka (JP); Toshihiro Okamura, Shizuoka (JP); Takeshi Masuda, Shizuoka (JP); Osamu Endo, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 253 days.

(21) Appl. No.: 15/771,144

(22) PCT Filed: Oct. 26, 2016

(86) PCT No.: PCT/JP2016/081786

§ 371 (c)(1),
(2) Date: Apr. 27, 2018

(87) PCT Pub. No.: WO2017/073635

PCT Pub. Date: May 4, 2017

(65) Prior Publication Data

US 2018/0319320 A1 Nov. 8, 2018

(30) Foreign Application Priority Data

Oct. 27, 2015 (JP) ............................ JP2015-211223
Oct. 27, 2015 (JP) ............................ JP2015-211224
Oct. 27, 2015 (JP) ............................ JP2015-211225

(51) Int. Cl.
*B60Q 1/24* (2006.01)
*B60R 21/00* (2006.01)
(Continued)

(52) U.S. Cl.
CPC .............. *B60Q 1/24* (2013.01); *B60Q 1/0011* (2013.01); *B60Q 1/0035* (2013.01);
(Continued)

(58) Field of Classification Search
CPC ...... B60Q 1/24; B60Q 1/0011; B60Q 1/2611; B60Q 1/0023; F21S 41/24; F21S 41/25; F21S 41/365; F21S 41/68
See application file for complete search history.

(56) References Cited

U.S. PATENT DOCUMENTS 2,086,524 A * 7/1937 Clark .................. B60Q 1/2611 362/493
3,522,423 A * 8/1970 Henry-Biabaud ....... B60Q 1/18 362/43
(Continued)

FOREIGN PATENT DOCUMENTS

DE 102013001086 A1 * 1/2013 ............... B60Q 1/24
DE 202013006302 A1 * 12/2013 ............... B60Q 1/24
(Continued)

OTHER PUBLICATIONS

International Search Report dated Jan. 10, 2017, issued by the International Searching Authority in counterpart International Application No. PCT/JP2016/081786 (PCT/ISA/210).
(Continued)

*Primary Examiner* — Evan P Dzierzynski
(74) *Attorney, Agent, or Firm* — Sughrue Mion, PLLC

(57) ABSTRACT

There is provided a vehicular component which include an illumination device capable of favorably illuminating the periphery of a host vehicle. There is provided a vehicular component that includes an illumination device (3) installed on a roof part (30) and configured to cover a vehicle interior space from above. The illumination device (4) includes a light source unit (100) and a light emitting unit (300). The light emitting unit (300) configured to emit light by light emitted from the light source unit (100) is provided along an outer peripheral edge (31) of the roof part (30) in a top view of the vehicle (1).

17 Claims, 13 Drawing Sheets

(51) Int. Cl.

| | |
|---|---|
| ***B60Q 1/26*** | (2006.01) |
| ***F21S 41/24*** | (2018.01) |
| ***F21S 41/25*** | (2018.01) |
| ***F21S 41/365*** | (2018.01) |
| ***F21S 41/68*** | (2018.01) |
| ***F21S 41/151*** | (2018.01) |
| ***B60Q 1/00*** | (2006.01) |
| *F21Y 115/10* | (2016.01) |
| *F21W 102/17* | (2018.01) |
| *F21W 107/10* | (2018.01) |

(52) U.S. Cl.

CPC ............ *B60Q 1/2611* (2013.01); *B60R 21/00* (2013.01); *F21S 41/151* (2018.01); *F21S 41/24* (2018.01); *F21S 41/25* (2018.01); *F21S 41/365* (2018.01); *F21S 41/68* (2018.01); *B60Q 1/0023* (2013.01); *F21V 2200/13* (2015.01); *F21W 2102/17* (2018.01); *F21W 2107/10* (2018.01); *F21Y 2115/10* (2016.08)

(56) References Cited

U.S. PATENT DOCUMENTS

| | | | | |
|---|---|---|---|---|
| 5,193,893 | A * | 3/1993 | Mitko | B60Q 1/0011 340/468 |
| 5,884,997 | A * | 3/1999 | Stanuch | B60Q 1/2611 362/493 |
| 6,657,581 | B1 * | 12/2003 | Lippert | B60K 31/0008 342/70 |
| 9,069,080 | B2 * | 6/2015 | Stettner | G01S 17/86 |
| 2008/0046150 | A1 * | 2/2008 | Breed | B60R 21/0134 701/45 |
| 2010/0290774 | A1 | 11/2010 | Matsuoka et al. | |
| 2011/0128141 | A1 * | 6/2011 | Purks | B60Q 1/38 340/475 |
| 2012/0031939 | A1 | 2/2012 | Jutila et al. | |
| 2013/0058115 | A1 * | 3/2013 | Pfeil | B60Q 3/64 362/511 |
| 2015/0258928 | A1 * | 9/2015 | Goto | B60Q 1/085 701/49 |
| 2016/0236613 | A1 | 8/2016 | Trier | |
| 2016/0250963 | A1 | 9/2016 | Reuschel et al. | |
| 2018/0037153 | A1 | 2/2018 | Reuschel et al. | |
| 2018/0228004 | A1 * | 8/2018 | Masuda | B60Q 1/50 |
| 2019/0039503 | A1 | 2/2019 | Reuschel et al. | |

FOREIGN PATENT DOCUMENTS

| | | | | |
|---|---|---|---|---|
| DE | 10 2013 008 075 | A1 | 11/2014 | |
| DE | 10 2013 018 784 | A1 | 5/2015 | |
| DE | 10 2015 205 630 | A1 | 10/2015 | |
| DE | 20201710901 | U1 * | 2/2017 | B60Q 1/24 |
| EP | 3090900 | A1 * | 7/2015 | B60Q 1/24 |
| JP | 60174338 | A | 9/1985 | |
| JP | 9277887 | A | 10/1997 | |
| JP | 2006137228 | A | 6/2006 | |
| JP | 2010264872 | A | 11/2010 | |
| WO | WO-2008050365 | A1 * | 5/2008 | B60Q 1/52 |
| WO | WO 2017018349 | A1 * | 2/2017 | B60Q 1/00 |

OTHER PUBLICATIONS

Written Opinion dated Jan. 10, 2017, issued by the International Searching Authority in counterpart International Application No. PCT/JP2016/081786 (PCT/ISA/237).

Communication dated May 24, 2019 issued by the European Intellectual Property Office in counterpart European Application No. 16859864.7.

* cited by examiner

VEHICLE COMPONENT, AND VEHICLE

TECHNICAL FIELD

The disclosure relates to a vehicular component and a vehicle.

BACKGROUND ART

Currently research on the automatic driving technique of automobiles has been actively conducted in each country and each country is examining laws so as to enable a vehicle (hereinafter, a "vehicle" refer to an automobile) to travel in an automatic driving mode on public roads. Here, in the automatic driving mode, a vehicle system automatically controls the travelling of a vehicle. Specifically in the automatic driving mode, the vehicle system performs at least one of a steering control (control of the vehicle in the travelling direction), a brake control and an accelerator control (control of the braking and acceleration/deceleration of the vehicle) based on various information obtained from a camera, a sensor, and a radar or the like. On the other hand, in a manual driving mode described below, a driver controls the travelling of a vehicle, as in most of conventional vehicles. Specifically, in the manual driving mode, the travelling of the vehicle is controlled according to an operation (steering operation, braking operation, accelerator operation) of a driver, and the vehicle system does not automatically perform the steering control, the brake control and the accelerator control. Meanwhile, the driving mode of the vehicle is not a concept existing only in some vehicles but a concept existing in all vehicles including conventional type vehicles having no automatic driving function. For example, the driving mode of the vehicle is classified according to a vehicle control method or the like.

Thus, in the future, it is expected that vehicles (hereinafter, suitably referred to as "automatically driving vehicle") travelling in the automatic driving mode and vehicles (hereinafter, suitably referred to as "manually driving vehicle") travelling in the manual driving mode coexist on public roads. In particular, on the road where the automatically driving vehicle and the manually driving vehicle coexist, it is desirable that information relating to the automatic driving is presented to other vehicles and pedestrians or the like.

For example, if a driver of a host vehicle travelling behind other vehicle can grasp information that other vehicle is automatically driving, the driver is considered to operate a steering wheel carefully or with confidence when overtaking other vehicle. Further, if a pedestrian trying to cross a crosswalk can grasp information relating to the automatic driving of other vehicle approaching the crosswalk, the pedestrian is considered to safely cross the crosswalk.

On the other hand, the Patent Document 1 discloses an automatic follow-up travelling system in which a following vehicle travels so as to automatically follow a preceding vehicle. In the automatic follow-up travelling system, each of the preceding vehicle and the following vehicle has a display device, character information for preventing interruption of other vehicle between the preceding vehicle and the following vehicle is displayed on the display device of the preceding vehicle, and character information indicating the automatic follow-up travelling mode is displayed on the display device of the following vehicle.

CITATION LIST

Patent Document

Patent Document 1: Japanese Unexamined Patent Application Publication No. 9-277887

DISCLOSURE OF INVENTION

Problems to be Solved by Invention

However, in the automatic driving mode, for example, it is necessary to confirm the presence of a pedestrian around the host vehicle.

Therefore, the disclosure aims to provide a vehicular component and a vehicle which include an illumination device capable of favorably illuminating the periphery of a host vehicle.

Means for Solving the Problems (1) According to the disclosure, there is provided a vehicular component that includes an illumination device installed on a roof part included in a vehicle and configured to cover a vehicle interior space from above, wherein the illumination device includes a light source unit and a light emitting unit, and wherein the light emitting unit configured to emit light by light emitted from the light source unit is provided along an outer peripheral edge of the roof part in a top view of the vehicle.

(2) In the vehicular component according to the above disclosure, a plurality of light emitting units may be provided along the outer peripheral edge of the roof part.

(3) In the vehicular component according to the above disclosure, the light emitting unit having a strip shape may extend along the outer peripheral edge of the roof part.

(4) In the vehicular component according to the above disclosure, in a side view of the vehicle, at least a part of an upper edge of the vehicle may be formed by the light emitting unit.

(5) In the vehicular component according to the above disclosure, in a top view of the vehicle, the illumination device may have an annular shape bordering the outer peripheral edge of the roof part.

(6) In the vehicular component according to the above disclosure, in a top view of the vehicle, the light emitting unit may have an annular shape bordering the outer peripheral edge of the roof part.

(7) In the vehicular component according to the above disclosure, in a top view of the vehicle, the light source unit may be provided on the center side of the roof part with respect to the light emitting unit, a light guide member may be provided between the light source unit and the light emitting unit, and the light guide member may guide the light emitted from the light source unit to the light emitting unit.

(8) In the vehicular component according to the above disclosure, the light emitting unit may be configured to emit light downward.

(9) In the vehicular component according to the above disclosure, the vehicle may travel in an automatic driving mode, and the light emitting unit may be turned on during the automatic driving mode.

(10) In the vehicular component according to the above disclosure, at least one of a camera configured to acquire an image around the vehicle and an infrared sensor configured to acquire infrared information around the vehicle may be incorporated into the illumination device.

(11) In the vehicular component according to the above disclosure, the camera or the infrared sensor may be arranged alternately with the light emitting unit along the outer peripheral edge of the roof part.

(12) According to the disclosure, there is provided a vehicular component that includes an illumination device, in which when, in a virtual cylindrical screen vertically provided at a position 20 m away from a center of the vehicle, a front center of the vehicle is set to 0 degree, a rear center of the vehicle is set to 180 degrees, and an angle is defined so that the angle increases from the front center of the vehicle toward a driver' seat side, the illumination device is configured to irradiate light having a predetermined illuminance or higher downward than a horizontal line toward at least an area from 20 degrees to 135 degrees.

(13) In the vehicular component according to the above disclosure, the illumination device may be switched between a first mode in which light having a predetermined illuminance or higher is irradiated downward than the horizontal line toward an area from 180 degrees to 340 degrees and a second mode in which light having a predetermined illuminance or higher is irradiated downward and upward than the horizontal line toward the area from 180 degrees to 340 degrees.

(14) In the vehicular component according to the above disclosure, the illumination device may irradiate light having a predetermined illuminance or higher toward a road surface of two or more lanes laterally away from a travelling lane of a host vehicle.

(15) In the vehicular component according to the above disclosure, the illumination device may irradiate light having a predetermined illuminance or higher downward than the horizontal line toward at least the area from 20 degrees to 135 degrees at least during the automatic driving mode.

(16) According to the disclosure, there is provided a vehicular component that includes an illumination device, wherein the illumination device is configured to irradiate light having a predetermined illuminance or higher toward a road surface around a vehicle in a continuous annular shape surrounding the vehicle, in a top view of the vehicle.

(17) In the vehicular component according to the above disclosure, the illumination device may irradiate light at a position at least 50 cm away from an outer edge of the vehicle, in a top view of the vehicle.

(18) According to the disclosure, there is provided a vehicle that includes the vehicular component described in the above (16), wherein the illumination device irradiates light having a predetermined illuminance or higher toward a road surface around the vehicle in a continuous annular shape surrounding the vehicle at least during the automatic driving mode of the vehicle.

(19) According to the disclosure, there is provided a vehicle that includes the vehicular component described in the above (16), wherein the light emitting unit of the illumination device is provided below a lower edge of a windshield.

(20) According to the disclosure, there is provided a vehicle that includes the vehicular component described in the above (16), wherein the light emitting unit of the illumination device is provided above an upper edge of a windshield, and wherein the light emitting unit irradiates light downward.

(21) According to the disclosure, there is provided a vehicle that includes the vehicular component described in any one of the above (1) to (20), wherein the light emitting unit of the illumination device is provided above any light emitting unit of a headlamp, a brake lamp and a turn signal lamp.

Effects of Invention

According to the disclosure, the vehicular component and the vehicle which include the illumination device capable of favorably illuminating the periphery of the host vehicle are provided.

BRIEF DESCRIPTION OF DRAWINGS

FIG. 7A is a side view, and FIG. 7B is a front view.

DESCRIPTION OF EMBODIMENTS

Figure 1A:
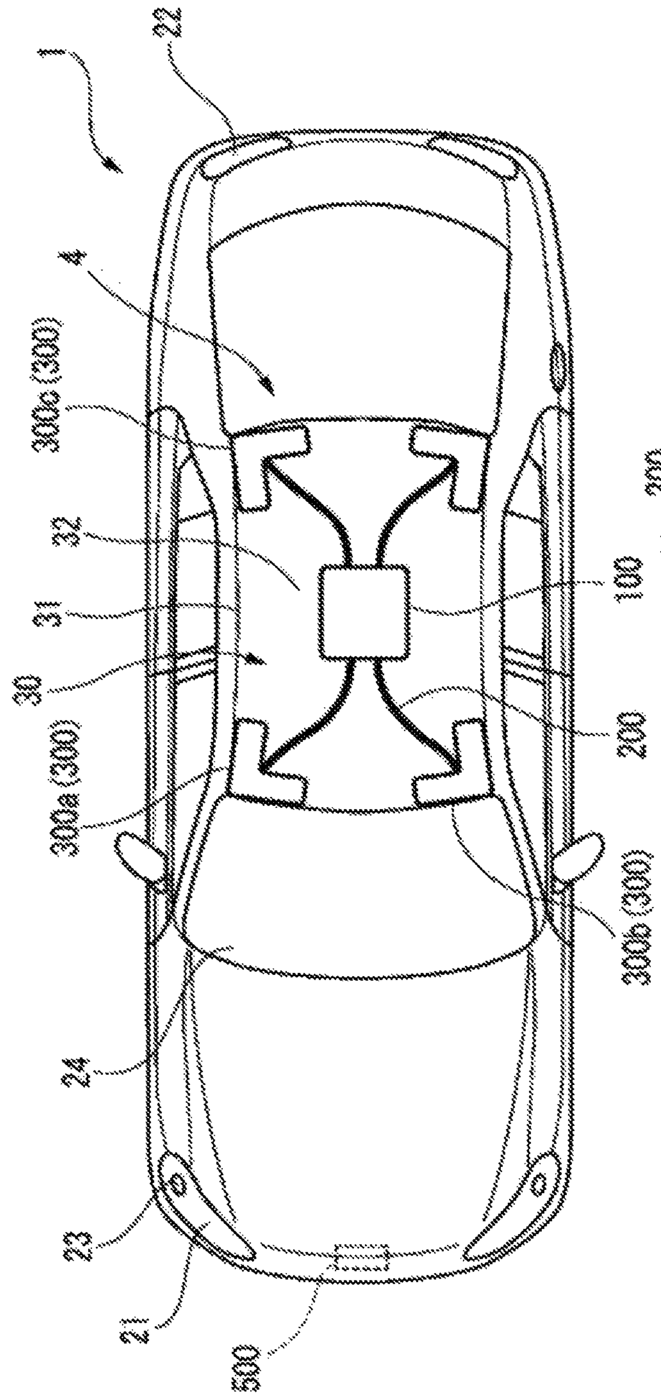
FIG. 1A is a top view of a vehicle according to an embodiment of the disclosure.

Hereinafter, embodiments of the disclosure (hereinafter, referred to as an "embodiment") will be described with reference to the drawings. In addition, for the sake of convenience of explanation, the explanation of members having the same reference numerals as those already described in the description of the present embodiment will be omitted. Further, for the sake of convenience of explanation, dimensions of each member shown in the drawings may be different from actual dimensions of each member.

Further, for the sake of convenience of explanation, "a left and right direction," "a front and rear direction," and "an upper and lower direction" are appropriately mentioned in the description of the present embodiment. These directions refer to the relative directions set for a vehicle 1 shown in FIGS. 1A and 1B. Here, "the upper and lower direction" refers to a direction including "an upper direction" and "a lower direction." "The front and rear direction" refers to a direction including "a front direction" and "a rear direction." "The left and right direction" refers to a direction including "a left direction" and "a right direction."

First Embodiment

Figure 1B:
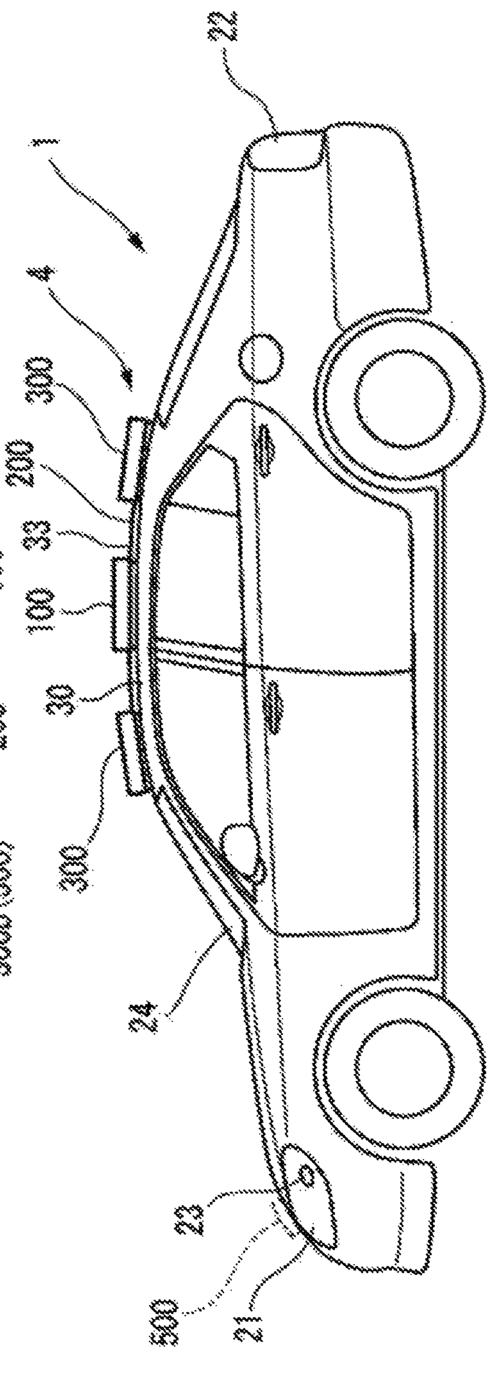
FIG. 1B is a side view of the vehicle shown in FIG. 1A.

FIGS. 1A and 1B show a vehicle 1 on which a vehicular component according to the first embodiment is mounted. FIG. 1A shows a top view of the vehicle 1, and FIG. 1B shows a side view of the vehicle 1. The vehicle 1 is an automobile capable of travelling in an automatic driving mode and has a vehicular component including an illumination device 4.

Figure 2:
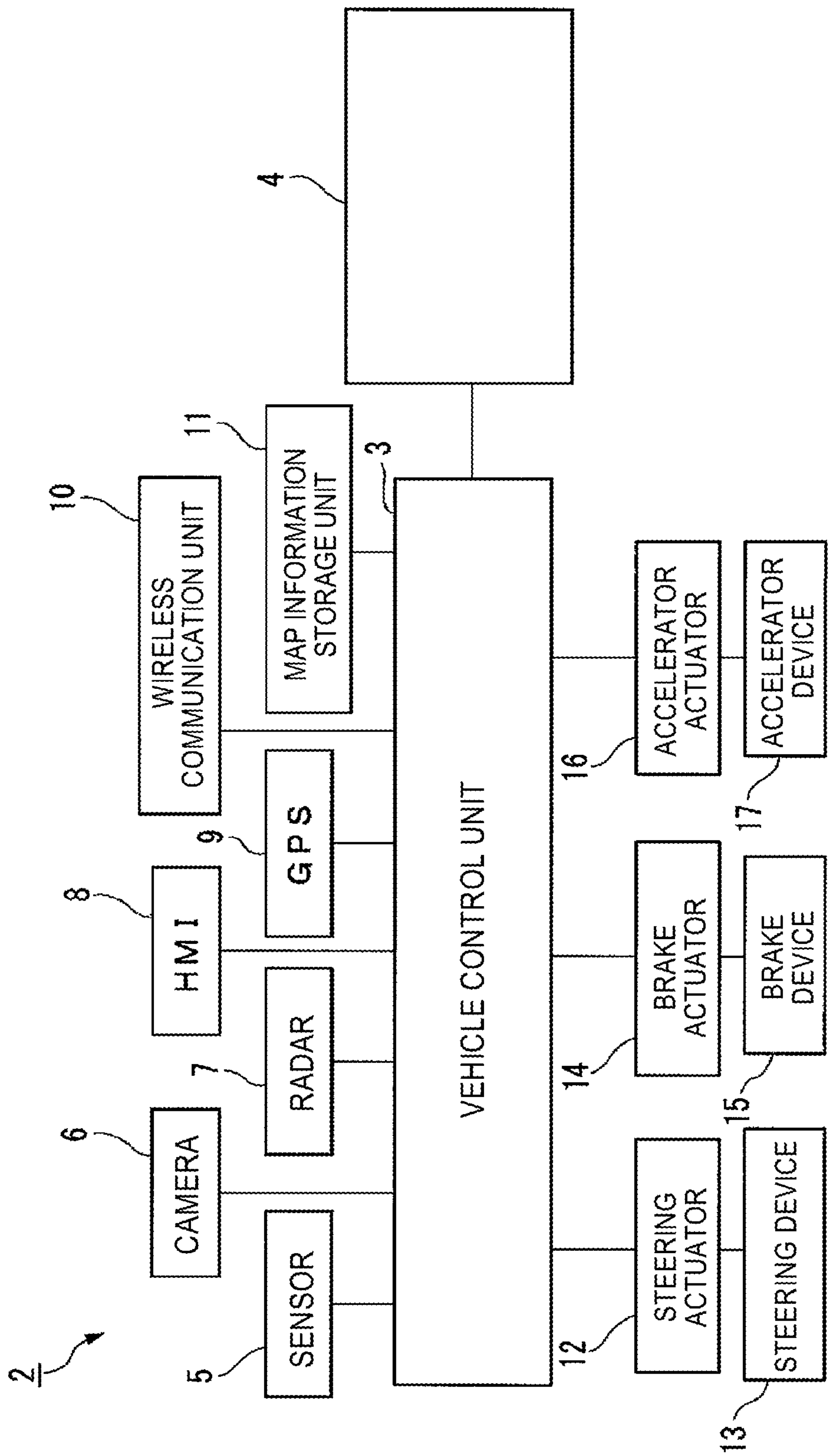
FIG. 2 is a block diagram of a vehicle system.

Next, a vehicle system 2 of the vehicle 1 will be described with reference to FIG. 2. FIG. 2 shows a block diagram of the vehicle system 2. As shown in FIG. 2, the vehicle system 2 includes a vehicle control unit 3, the illumination device 4, a sensor 5, a camera 6, a radar 7, a HMI (Human Machine Interface) 8, a GPS (Global Positioning System) 9, a wireless communication unit 10, and a map information storage unit 11. The vehicle system 2 further includes a steering actuator 12, a steering device 13, a brake actuator 14, a brake device 15, an accelerator actuator 16, and an accelerator device 17.

The vehicle control unit 3 is configured by an electronic control unit (ECU). The electronic control unit includes a processor such as a CPU (Central Processing Unit), a ROM (Read Only Memory) in which various vehicle control programs are stored, and a RAM (Random Access Memory) in Which various vehicle control data are temporarily stored. The processor is configured to develop, on the RAM, a program designated from the various vehicle control programs stored in the ROM and execute various processes in cooperation with the RAM. The vehicle control unit 3 is configured to control the travelling of the vehicle 1.

The sensor 5 includes an acceleration sensor, a speed sensor, a gyro sensor, and the like. The sensor 5 is configured to detect a travelling condition of the vehicle 1 and output the travelling condition information to the vehicle control unit 3. The sensor 5 may further include a seating sensor configured to detect whether or not a driver is sitting on a driver's seat, a face orientation sensor configured to detect a direction of a driver's face, an external weather sensor configured to detect external weather condition, a human sensor configured to detect whether or not a person is inside a vehicle, and the like. Furthermore, the sensor 5 may include an illuminance sensor configured to detect the illuminance of the surrounding environment of the vehicle 1.

The camera 6 is, for example, a camera including an imaging device such as a CCD (Charge-Coupled Device) and CMOS (complementary MOS). The camera 6 is a camera for detecting visible light or an infrared camera for detecting infrared rays. The radar 7 is a millimeter wave radar, a microwave radar, a laser radar, or the like. The camera 6 and the radar 7 are configured to detect the surrounding environment (other vehicles, pedestrians, road shapes, traffic signs, obstacles, etc.) of the vehicle 1 and output the surrounding environment information to the vehicle control unit 3.

The HMI 8 includes an input unit configured to receive an input operation from a driver and an output unit configured to output the travelling information and the like to the driver. The input unit includes a steering wheel, an accelerator pedal, a brake pedal, a driving mode changeover switch for switching the driving mode of the vehicle 1, and the like. The output unit is a display for displaying various travelling information.

The GPS 9 is configured to acquire current position information of the vehicle 1 and output the acquired current position information to the vehicle control unit 3. The wireless communication unit 10 is configured to receive travelling information of other vehicle around the vehicle 1 from other vehicle and transmit the travelling information of the vehicle 1 to other vehicle (inter-vehicle communication). Further, the wireless communication unit 10 is configured to receive infrastructure information from infrastructure equipment such as traffic lights and sign lamps and transmit the travelling information of the vehicle 1 to the infrastructure equipment (road-to-vehicle communication). The map information storage unit 11 is an external storage device such as a hard disk drive in which map information is stored. The map information storage unit 11 is configured to output the map information to the vehicle control unit 3.

When the vehicle 1 travels in an automatic driving mode, the vehicle control unit 3 automatically generates at least one of a steering control signal, an accelerator control signal and a brake control signal based on the travelling condition information, the surrounding environment information, the current position information, the map information, and the like. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. Thus, in the automatic driving mode, the travelling of the vehicle 1 is automatically controlled by the vehicle system 2.

On the other hand, when the vehicle 1 travels in a manual driving mode, the vehicle control unit 3 generates a steering control signal, an accelerator control signal and a brake control signal in accordance with a manual operation of a driver on the accelerator pedal, the brake pedal and the steering wheel. Thus, in the manual driving mode, the steering control signal, the accelerator control signal and the brake control signal are generated by the manual operation of the driver, so that the travelling of the vehicle 1 is controlled by the driver.

Next, a driving mode of the vehicle 1 will be described. The driving mode includes an automatic driving mode and a manual driving mode. The automatic driving mode includes a fully automatic driving mode, an advanced driving support mode, and a driving support mode. In the fully automatic driving mode, the vehicle system 2 automatically performs all of the travelling controls of the steering control, the brake control and the accelerator control, and the driver is not in a state where it is possible to drive the vehicle 1. In the advanced driving support mode, the vehicle system 2 automatically performs all of the travelling controls of the steering control, the brake control and the accelerator control, and the driver does not drive the vehicle 1 although the driver is in a state where it is possible to drive the vehicle 1. In the driving support mode, the vehicle system 2 automatically performs a part of the travelling controls of the steering control, the brake control and the accelerator control, and the driver drives the vehicle 1 under the driving support of the vehicle system 2. On the other hand, in the manual driving mode, the vehicle system 2 does not automatically perform the travelling controls, and the driver drives the vehicle 1 without the driving support of the vehicle system 2.

Further, the driving mode of the vehicle 1 may be switched by operating a driving mode changeover switch. In this case, the vehicle control unit 3 switches the driving mode of the vehicle 1 among four driving modes (the fully automatic driving mode, the advanced driving support mode, the driving support mode, and the manual driving mode) in accordance with the operation of the driver on the driving mode changeover switch. Further, the driving mode of the vehicle 1 may be automatically switched on the basis of the information relating to a travel-allowed section where the travelling of an automatic driving vehicle is allowed or a travel-prohibited section where the travelling of the automatic driving vehicle is prohibited or the information relating to the external weather condition. In this case, the vehicle control unit 3 switches the driving mode of the vehicle 1 based on such information. Furthermore, the driving mode of the vehicle 1 may be automatically switched by using a seating sensor, a face orientation sensor, or the like. In this case, the vehicle control unit 3 switches the driving mode of the vehicle 1 based on the output signal from the seating sensor or the face orientation sensor.

The vehicular component according to the present disclosure is a component to be mounted on a vehicle and includes the illumination device 4. The vehicular component may include a support structure for supporting an illumination device on a vehicle, a support component such as a stay, a connection structure between an illumination device and a vehicle, and a connection component (such as a bolt/nut) between an illumination device and a vehicle. Alternatively, as necessary, the vehicular component may include a component such as a camera.

Figure 3:
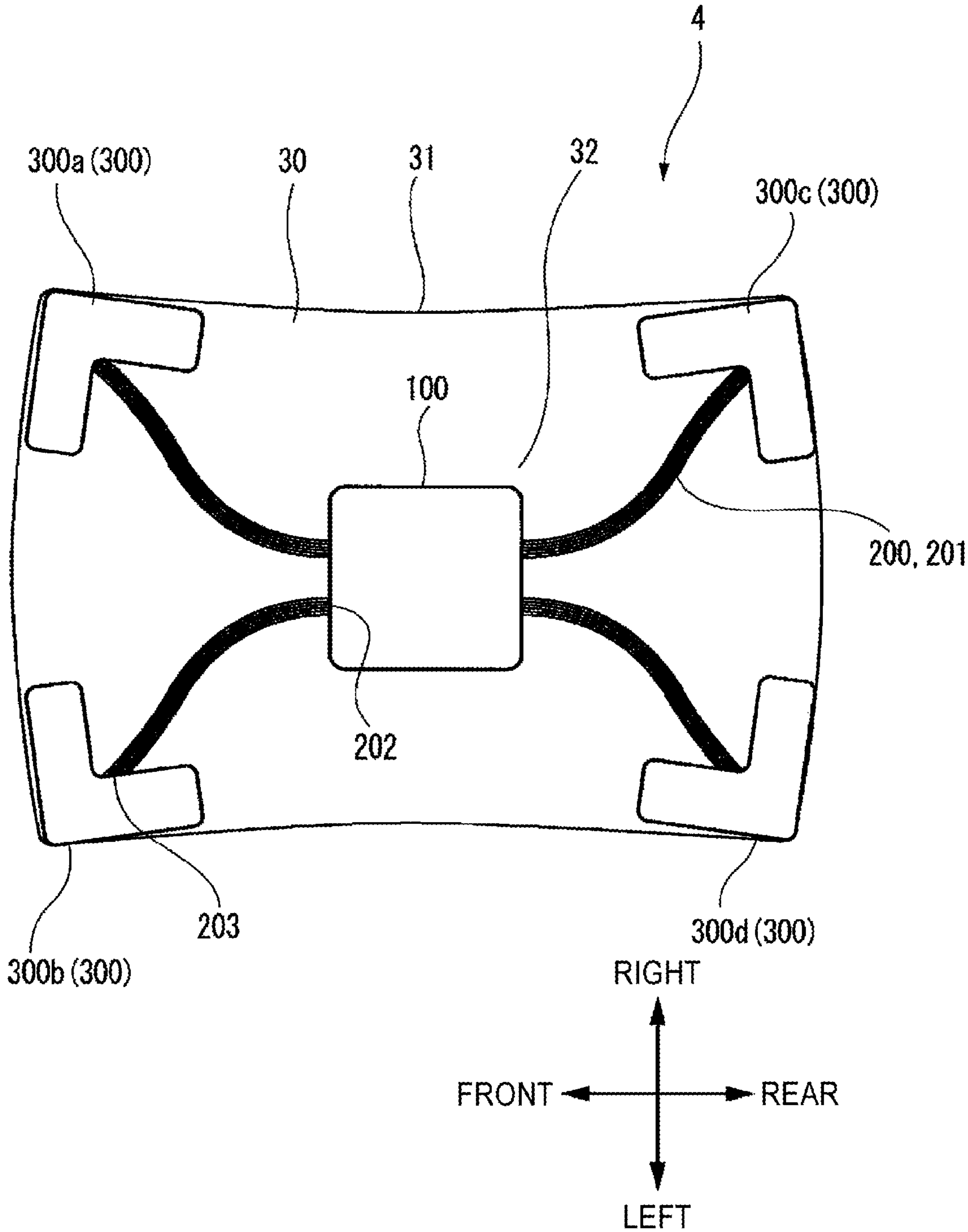
FIG. 3 is a top view showing an illumination device.

Next, details of the illumination device 4 will be described. FIG. 3 is a top view showing the illumination device 4. As shown in FIG. 3, the illumination device 4 includes a light engine 100 (an example of the light source unit), a light guide 200, and a light emitter 300 (an example of the light emitting unit). The light engine 100 generates light. The light guide 200 transmits the light generated by the light engine 100 to the light emitter 300. The light emitter 300 emits the light generated by the light engine 100 to the outside of the vehicle 1.

The light guide 200 can be configured by an optical fiber 201, for example. In this embodiment, the light guide 200 has a plurality of optical fibers 201. The light guide 200 has an incident end face 202 on which the light generated by the light engine 100 is incident, and an emission end face 203 provided in the light emitter 300.

<Light Engine 100>

Figure 4:
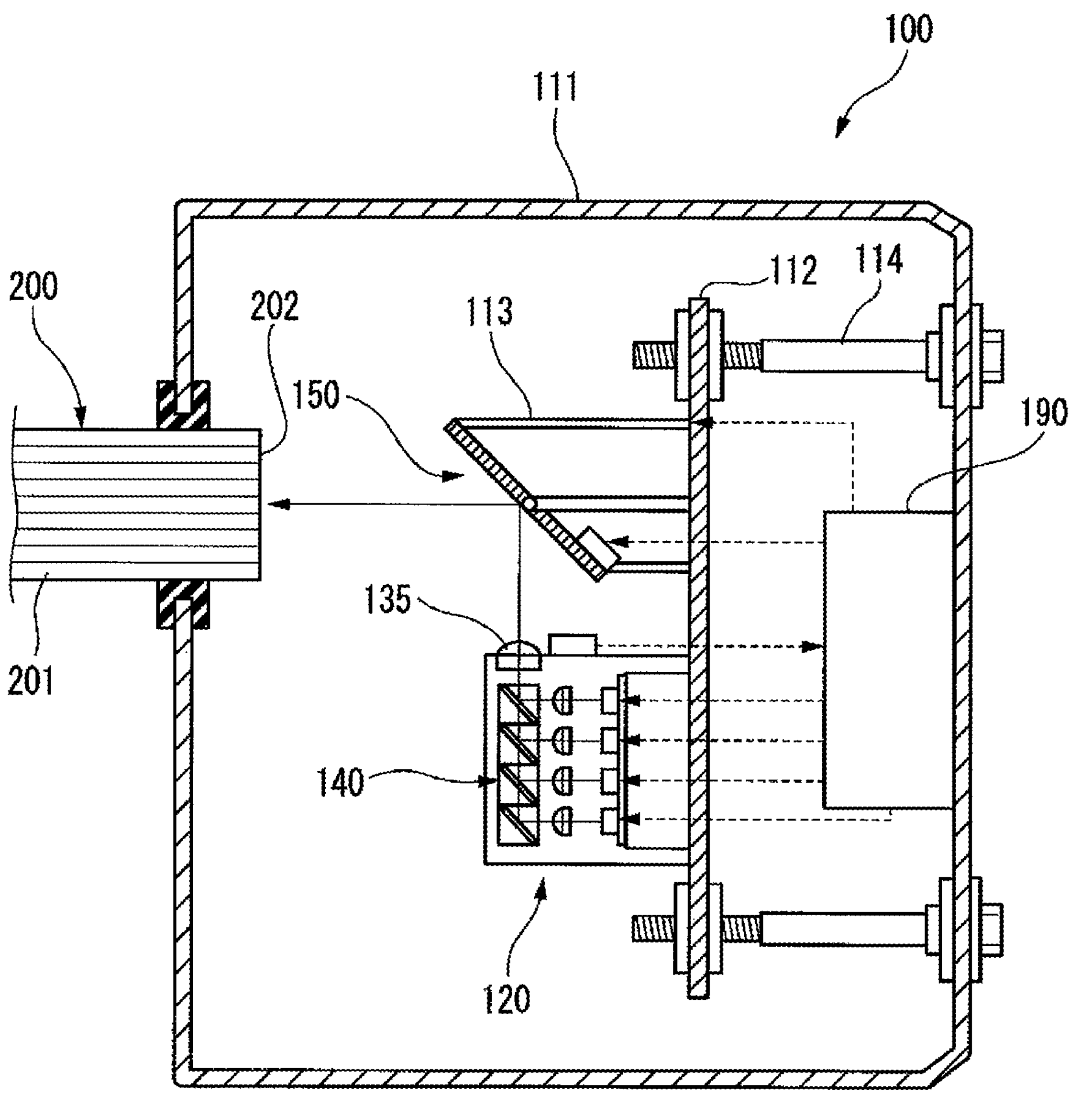
FIG. 4 is a side sectional view of a light engine.

FIG. 4 is a sectional view of the light engine 100. As shown in FIG. 4, the light engine 100 includes a case 111, a support plate 112, a light source unit 120, a reflection unit 150, and a light engine control unit 190. The support plate 112 is supported on the case 111 by aiming screws 114.

The reflection unit 150 is supported on the case 111 via the support plate 112. The reflection unit 150 has a reflection mirror 151 (see FIG. 6). The reflection unit 150 reflects light emitted from the light source unit 120 and causes the light to be incident on the incident end face 202 of the light guide 200. The reflection unit 150 is fixed to leading ends of a pair of projections 113 protruding from the support plate 112.

(Light Source Unit 120)

Figure 5:
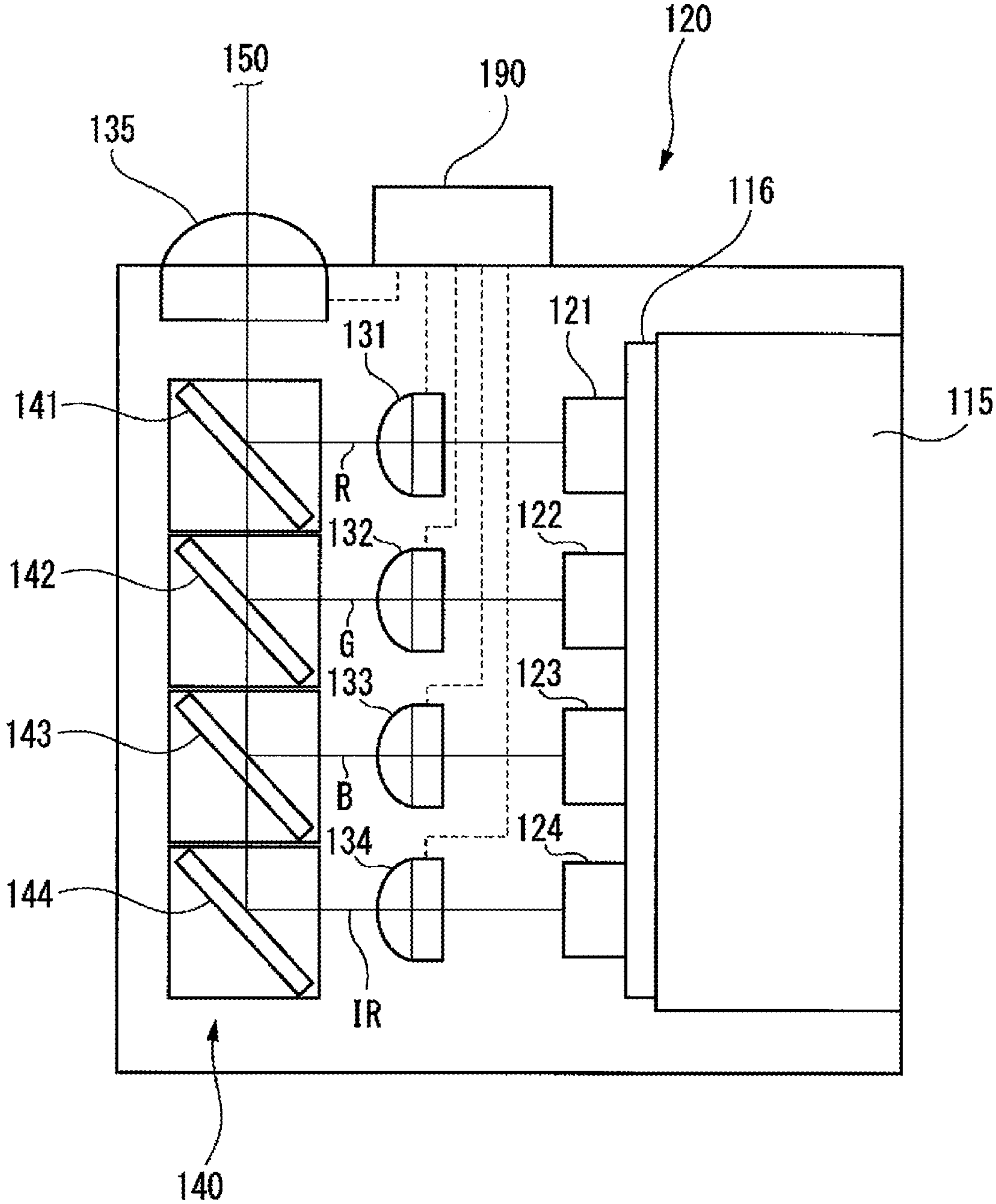
FIG. 5 is an enlarged view of a main part of FIG. 4.

FIG. 5 is an enlarged view of a main part of FIG. 4. As shown in FIG. 5, the light source unit 120 includes a plurality of light sources 121, 122, 123, 124, a plurality of lenses 131, 132, 133, 134, a collector 140, and a heat sink 115. As shown in FIG. 4, the light source unit 120 is supported on the support plate 112 so that the heat sink 115 is in contact with the support plate 112.

As shown in FIG. 5, the light source unit 120 has four laser light sources. The light source unit 120 has a first laser light source 121 for emitting a red light R, a second laser light source 122 for emitting a green light G, a third laser light source 123 for emitting a blue light B, and a fourth laser light source 124 for emitting an infrared light IR. Meanwhile, the light source unit 120 may have a light source for emitting light of wavelengths other than the wavelength of the above light. Alternatively, the light source unit 120 may have a light source other than the laser light source, for example, a filament light source, a halogen light source, an organic EL, or the like.

The first laser light source 121 to the fourth laser light source 124 are provided on a common light source substrate 116. The first laser light source 121 to the fourth laser light source 124 are provided on the front surface of the light source substrate 116, and the heat sink 115 is provided on the rear surface of the light source substrate 116. Heat generated from the first laser light source 121 to the fourth laser light source 124 is radiated via the light source substrate 116, the heat sink 115, and the case 111 (see FIG. 4).

The light source unit 120 shown has the first lens 131, the second lens 132, the third lens 133, the fourth lens 134, and the fifth lens 135. All of the first lens 131 to the fifth lens 135 are collimating lenses.

The first lens 131 is provided to face the first laser light source 121. The first lens 131 is provided on an optical path of the first laser light source 121. The first lens 131 converts the red light R directed from the first laser light source 121 toward the collector 140 into parallel light.

The second lens 132 is provided to face the second laser light source 122. The second lens 132 is provided on an optical path of the second laser light source 122. The second lens 132 converts the green light G directed from the second laser light source 122 toward the collector 140 into parallel light.

The third lens 133 is provided to face the third laser light source 123. The third lens 133 is provided on an optical path of the third laser light source 123. The third lens 133 converts the blue light B directed from the third laser light source 123 toward the collector 140 into parallel light.

The fourth lens 134 is provided to face the fourth laser light source 124. The fourth lens 134 is provided on an optical path of the fourth laser light source 124. The fourth lens 134 converts the infrared light IR directed from the fourth laser light source 124 toward the collector 140 into parallel light.

As shown in FIG. 4, the fifth lens 135 is provided between the collector 140 and the reflection unit 150. The fifth lens 135 is provided on an optical path of the light emitted from the collector 140. The fifth lens 135 converts the light emitted from the collector 140 into parallel light.

The collector 140 collects light emitted from the first laser light source 121 to the fourth laser light source 124 and emits the light to the reflection unit 150. The collector 140 mixes light emitted from the first laser light source 121 to the fourth laser light source 124 and emits the light of a desired color to the reflection unit 150. For example, the collector 140 mixes light emitted from the first laser light source 121 to the third laser light source 123 and emits white light to the reflection unit 150. Alternatively, the collector 140 mixes light emitted from the first laser light source 121 and the third laser light source 123 and emits purple light to the reflection unit 150.

The collector 140 has a first dichroic mirror 141, a second dichroic mirror 142, a third dichroic mirror 143, and a fourth dichroic mirror 144.

The first dichroic mirror 141 is provided on the optical path of the first laser light source 121. The first dichroic mirror 141 reflects at least red light and transmits blue light, green light and infrared light. The first dichroic mirror 141 reflects the red light R emitted from the first laser light source 121 and having passed through the first lens 131 toward the fifth lens 135.

The second dichroic mirror 142 is provided on the optical path of the second laser light source 122. The second dichroic mirror 142 reflects at least green light and transmits blue light and green light. The second dichroic mirror 142 reflects the green light G emitted from the second laser light source 122 and having passed through the second lens 132 toward the fifth lens 135.

The third dichroic mirror 143 is provided on the optical path of the third laser light source 123. The third dichroic mirror 143 reflects at least blue light and transmits infrared light. The third dichroic mirror 143 reflects the blue light B emitted from the third laser light source 123 and having passed through the third lens 133 toward the fifth lens 135.

The fourth dichroic mirror 144 is provided on the optical path of the fourth laser light source 124. The fourth dichroic mirror 144 reflects at least infrared light. The fourth dichroic mirror 144 reflects the infrared light IR emitted from the fourth laser light source 124 and having passed through the fourth lens 134 toward the fifth lens 135.

The first dichroic mirror 141 to the fourth dichroic mirror 144 are positioned relative to each other so that optical paths of light reflected by the respective dichroic mirrors are parallel and light reflected by the respective dichroic mirrors is incident on the fifth lens 135. In this embodiment, the regions where the light is incident on the first dichroic mirror 141 to the fourth dichroic mirror 144 are aligned on a straight line.

Figure 6:
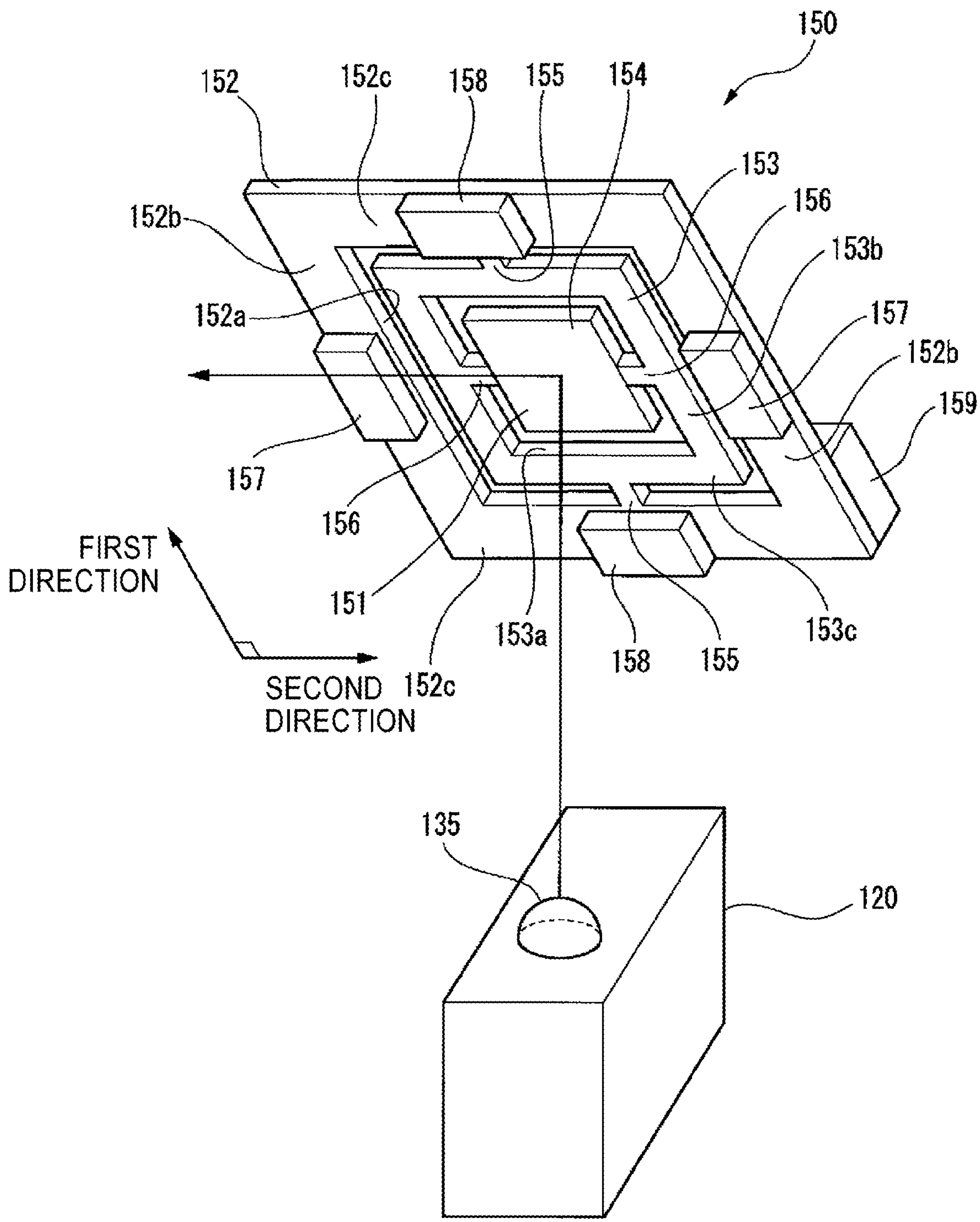
FIG. 6 is a schematic perspective view of a reflection unit.

FIG. 6 is a schematic perspective view of the reflection unit 150. As shown in FIG. 6, the reflection unit 150 is configured by a so-called galvanometer mirror. The reflection unit 150 has a base 152, a first pivoting body 153, a second pivoting body 154, a first torsion bar 155, a second torsion bar 156, a first permanent magnet 157, a second permanent magnet 158, a terminal part 159, and the reflection mirror 151.

The base 152 is a frame body having an opening 152 at the center. As shown in FIG. 4, the base 152 is fixed to the projections 113 in a state of being inclined with respect to the support plate 112. The base 152 is a rectangular member that has two sides **152*b* extending in a first direction and two sides 152*c* extending in a second direction orthogonal to the first direction. The terminal part 159 is provided on the base 152**.

The first pivoting body 153 is provided in the opening **152*a* of the base 152. The first pivoting body 153 is a frame body having an opening 153*a* at the center. The first pivoting body 153 is a rectangular member that has two sides 153*b* extending in the first direction and two sides 153*c* extending in the second direction. The first pivoting body 153 is supported on the base 152 via the first torsion bar 155 extending in the first direction. The first pivoting body 153 is pivotable with respect to the base 152** around an axis extending in the first direction.

The second pivoting body 154 is provided in the opening **153*a* of the first pivoting body 153. The second pivoting body 154 is a rectangular flat plate that has two sides extending in the first direction and two sides extending in the second direction. The reflection mirror 151 is formed on the front surface of the second pivoting body 154** by plating or vapor deposition or the like.

The second pivoting body 154 is supported on the first pivoting body 153 via the second torsion bar 156 extending in the second direction. The second pivoting body 154 is pivotable with respect to the first pivoting body 153 around an axis extending in the second direction. When the first pivoting body 153 is pivoted with respect to the base 152 around the axis extending in the first direction, the second pivoting body 154 is pivoted with respect to the base 152 around the axis extending in the first direction, together with the first pivoting body 153.

Each of the pair of first permanent magnets 157 is provided on the two sides **152*b* of the base 152 extending in the first direction. The first permanent magnets 157 form a magnetic field orthogonal to the first torsion bar 155. The first pivoting body 153 is provided with a first coil (not shown). The first coil is electrically connected to the light engine control unit 190 (see FIG. 4) via the terminal part 159**.

Each of the pair of second permanent magnets 158 is provided on the two sides **152*c* of the base 152 extending in the second direction. The second permanent magnets 158 form a magnetic field orthogonal to the second torsion bar 156. The second pivoting body 154 is provided with a second coil (not shown). The second coil is electrically connected to the light engine control unit 190 via the terminal part 159**.

The first coil and the second coil are controlled by the light engine control unit 190. The light engine control unit 190 controls the magnitude and direction of drive current flowing through the first coil and the second coil. Thus, the first pivoting body 153 and the second pivoting body 154 are pivoted around their axes. In this manner, the reflection unit 150 can reflect light emitted from the fifth lens 135 and incident on the reflection mirror 151 toward a desired position of the incident end face 202 of the light guide 200.

In the light engine 100 configured as described above, the first laser light source 121 to the fourth laser light source 124, the first coil and the second coil are controlled by the light engine control unit 190. In this way, the light engine 100 causes the light of a desired color to be incident on a desired region of the incident end face 202 of the light guide 200.

<Light Emitter 300>

Figure 7A:
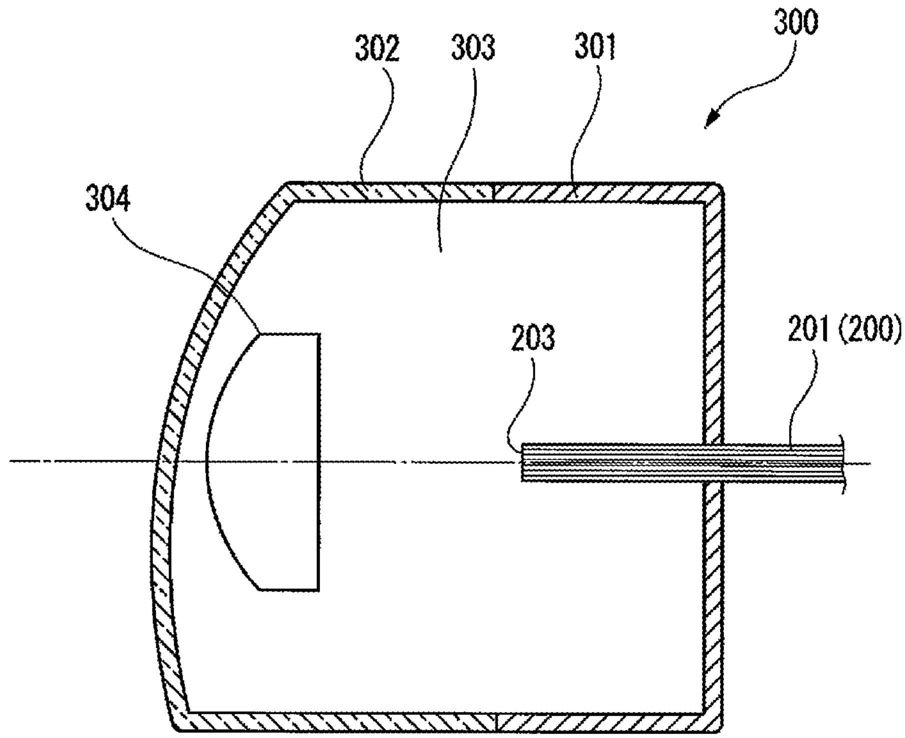
FIGS. 7A and 7B are views showing a light emitter.
Figure 7B:
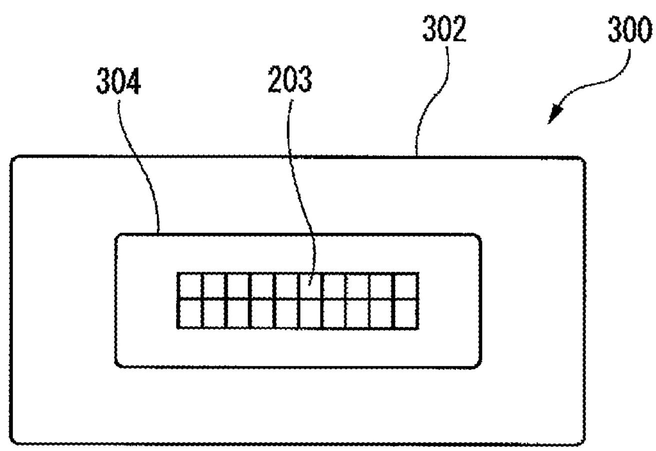

FIGS. 7A and 7B are views showing the light emitter 300. FIG. 7A shows a side view of the light emitter 300, and FIG. 7B shows a front view of the light emitter 300.

As shown in FIG. 7A, the light emitter 300 includes a housing 301 having an opening and an outer cover 302 closing the opening. The outer cover 302 is made of a light-transmitting resin or glass. A lamp chamber 303 is formed by the housing 301 and the outer cover 302.

The emission end face 203 of the light guide 200 is provided inside the lamp chamber 303. A projection lens 304 is provided on an optical path of light emitted from the emission end face 203 of the light guide 200. The projection lens 304 projects the light emitted from the emission end face 203 of the light guide 200 onto a desired region. In this embodiment, the projection lens 304 causes the light emitted from the light guide 200 to be emitted downward than the horizontal direction.

As shown in FIG. 7B, the light emitter 300 is a strip-like member extending in the horizontal direction. In a side view of the vehicle 1, the dimension of the light emitter 300 in the vertical direction is shorter than the dimension of the light emitter 300 in the horizontal direction. A plurality of optical fibers 201 are bundled so that the emission end face 203 of the light guide 200 has a strip shape extending in the horizontal direction. Further, in accordance with the shape of the emission end face 203, the projection lens 304 also has a strip shape extending in the horizontal direction in a front view. Furthermore, the outer cover 302 also has a strip shape extending in the horizontal direction.

As shown in FIGS. 1B and 3, the light emitter 300 of the present embodiment extends along an outer peripheral edge 31 of a roof part 30 of the vehicle 1. The light emitter 300 is provided on an upper surface of the roof part 30. The roof part 30 of the vehicle 1 is a part that covers the interior space of the vehicle from above. In the illumination device 4, the light emitter 300 (an example of the light emitting unit) for emitting the light emitted from the light engine 100 (an example of the light source) to the outside of the illumination device 4 is provided along the outer peripheral edge 31 of the roof part 30 in a top view of the vehicle 1.

In the illustrated example, four light emitters 300 are provided at four corners of the roof part 30 having a substantially rectangular shape. In a top view of the vehicle 1, the light emitters 300 have shapes bent according to the shapes of the corners of the roof part 30.

In this embodiment, the right front light emitter 300*a* provided at the right front portion of the roof part 30 illuminates the right front area of the vehicle 1. The left front light emitter 300*b* provided at the left front portion of the roof part 30 illuminates the left front area of the vehicle 1. The right rear light emitter 300*c* provided at the right rear portion of the roof part 30 illuminates the right rear area of the vehicle 1. The left rear light emitter 300*d* provided at the left rear portion of the roof part 30 illuminates the left rear area of the vehicle 1.

(Light Distribution Pattern)

By using the illumination device 4 configured as described above, for example, it is possible to form a first light distribution pattern P and a second light distribution pattern Q which will be described later.

Figure 8:
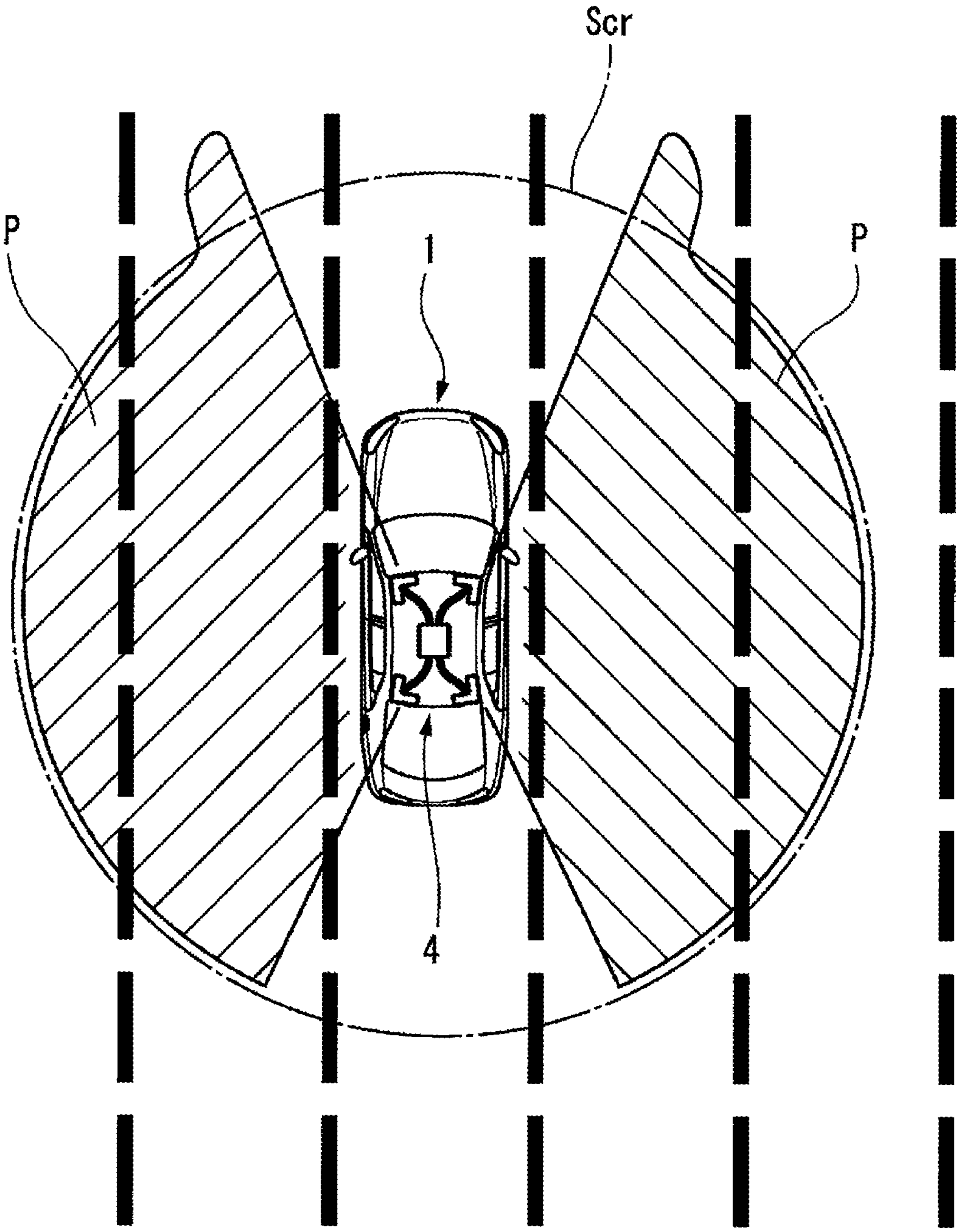
FIG. 8 is a view of the vehicle and a first light distribution pattern as seen from above.

FIG. 8 is a view of the vehicle 1 and the first light distribution pattern P as seen from above. FIG. 8 depicts a state in which the host vehicle 1 travels on the second lane from the left end among the four lanes. FIG. 8 depicts a state in which the vehicle 1 travels in area region where a driver's seat is provided at the right portion of the vehicle 1. In FIG. 8, the hatched areas indicate areas which are illuminated with light having a predetermined illuminance or more.

As shown in FIG. 8, the first light distribution pattern P irradiates the light having a predetermined illuminance or more to a road surface of two or more lanes laterally away from the travelling lane of the host vehicle 1 in at least one side of the left and right direction of the travelling lane of the host vehicle 1. In this way, when changing the lane, it is easy to confirm other vehicles travelling on two or more lanes laterally away from the travelling lane.

Figure 9A:
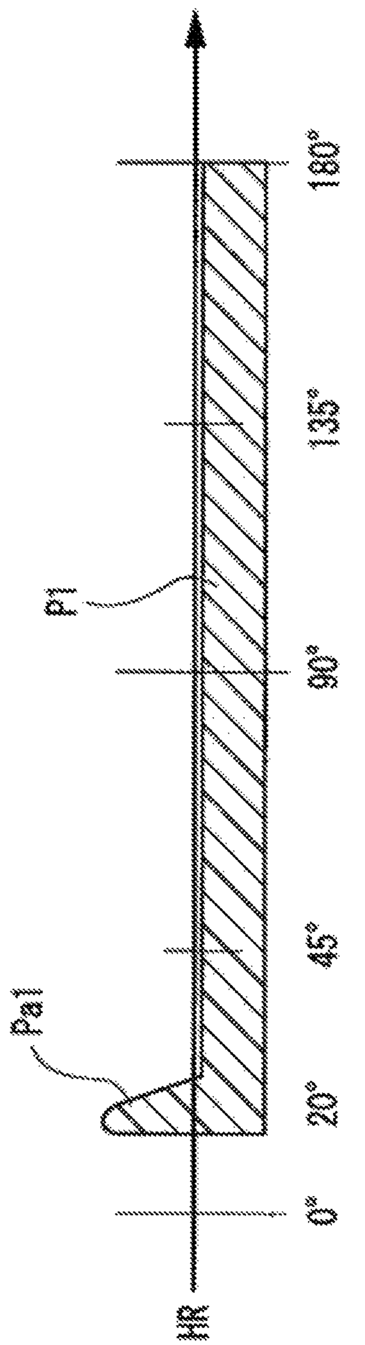
FIGS. 9A and 9B are deployment views of a virtually cylindrical screen on which the first light distribution pattern is formed.
Figure 9B:
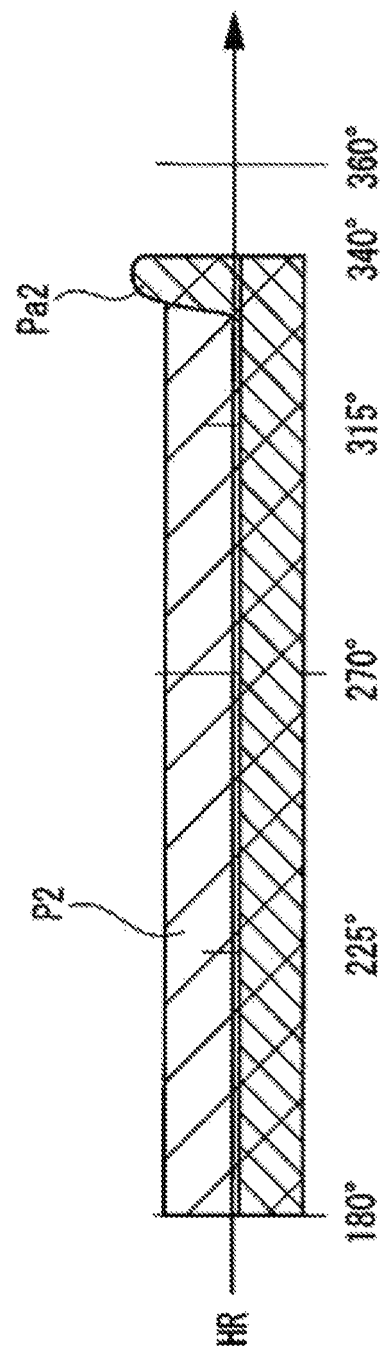

FIGS. 9A and 9B are deployment views of a virtual cylindrical screen Scr on which the first light distribution pattern P is formed. As shown in FIG. 8, the virtual cylindrical screen Scr is a cylindrical virtual screen vertically provided at a position 20 m away from the center of the vehicle 1. In FIG. 9, the front center of the vehicle 1 is set to 0 degree, the rear center of the vehicle 1 is set to 180 degrees, and an angle is defined so that the angle increases from the front center of the vehicle 1 toward a driver' seat. FIG. 9A shows the range from 0 degree to 180 degrees. FIG. 9B shows the range from 180 degrees to 360 degrees. In FIG. 9, a straight line HR indicates a horizontal line. Further, in FIG. 9, an area illuminated with light having a predetermined illuminance or higher is indicated by hatching.

As shown in FIG. 9A, the first light distribution pattern P irradiates light, which has a predetermined illuminance or higher, downward than the horizontal line HR to at least an area from 20 degrees to 135 degrees on the virtual cylindrical screen Scr.

According to such a first light distribution pattern P, at least when changing the lane to the overtaking lane, it is possible to confirm whether or not other vehicles are present on the overtaking lane and the next overtaking lane (the second lane away from the host vehicle 1). Further, since light is irradiated downward than the horizontal line HR, the glare to other vehicles is suppressed when other vehicles are present on the overtaking lane.

An area of 0 degree or more and less than 20 degrees and an area larger than 340 degrees and less than 360 degrees are areas in front of the vehicle 1. Since light is irradiated from a headlamp 21 to the front of the vehicle 1, the first light distribution pattern P does not irradiate light to the front of the vehicle 1. Further, since the first light distribution pattern P does not irradiate light to the front of the vehicle 1, there is no glare on the oncoming vehicle.

An area Pa1 from 20 degrees to 90 degrees is an area where a front pillar on the side of the driver may block the line of sight of the driver. However, since the first light distribution pattern P also irradiates light to this area, the driver may grasp the presence of an object by the reflected light from the object existing behind the front pillar. As shown, when light is irradiated upward from the horizontal line HR to the area Pa1, it is easier to grasp the object.

An area Pa2 from 270 degrees to 340 degrees is an area where a front pillar on the side of the front passenger may block the line of sight of the driver. However, since the first light distribution pattern P also irradiates light to this area, the driver may grasp the presence of an object by the reflected light from the object existing behind the front pillar. As shown in the figures, when light is irradiated upward from the horizontal line HR to the area Pa2, it is easier to grasp the object.

As shown in FIG. 9B, the illumination device 4 can be switched between a first mode P1 and a second mode P2 in the first light distribution pattern P.

In the first mode P1, light having a predetermined illuminance or higher is irradiated downward than the horizontal line HR to the area from 180 degrees to 340 degrees in the virtual cylindrical screen Scr. In the first mode P1, it is easy to acquire information on the side of the front passenger without giving glare to other vehicles when other vehicles or pedestrians are present on the side of the front passenger.

In the second mode P2, light having a predetermined illuminance or higher is irradiated downward and upward than the horizontal line HR to the area from 180 degrees to 340 degrees in the virtual cylindrical screen Scr. Since the second mode P2 is irradiated in a wider area than the first mode P1, it is easy to confirm whether or not other vehicles are present on the side of the front passenger.

For example, when the host vehicle 1 travels on the overtaking lane, the driver of the host vehicle 1 wants to know whether or not other vehicles are present on the travelling lane on the side of the front passenger. Thus, since the first light distribution pattern P is configured to be switchable between the first mode P1 and the second mode P2, the glare to other vehicles can be suppressed by irradiating light to the side of the vehicle 1 in the first mode P1 when the host vehicle 1 travels on the overtaking lane. Alternatively, when the host vehicle 1 travels on a road having a single lane, it is possible to make it easy to find a pedestrian by irradiating light to the side of the vehicle 1 in the second mode P2.

In this embodiment, the illumination device 4 may be configured to irradiate light, which has a predetermined illuminance or higher, downward than the horizontal line HR to at least the area from 20 degrees to 135 degrees at least during the automatic driving mode of the vehicle 1. During the automatic driving mode, it is easy to confirm the presence of other vehicles or pedestrians on the side of the vehicle 1, and the vehicle control unit 3 can obtain information on the side of the vehicle with high accuracy.

Figure 10:
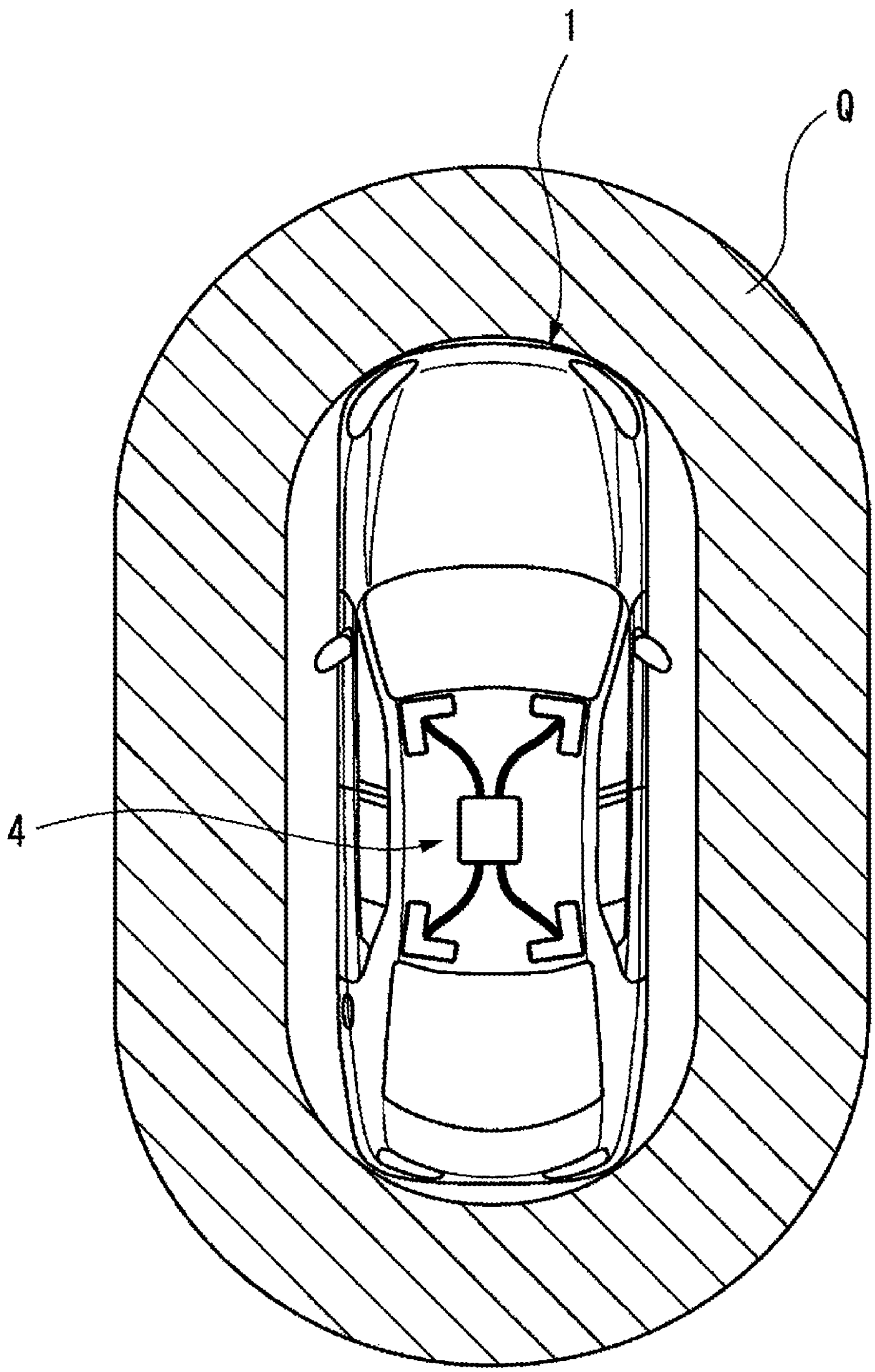
FIG. 10 is a view of the vehicle and a second light distribution pattern as seen from above.

Instead of the first light distribution pattern P described above, the illumination device 4 may form the second light distribution pattern Q to be described later. FIG. 10 is a view of the vehicle 1 and the second light distribution pattern Q as seen from above. As shown in FIG. 10, according to the second light distribution pattern Q, light having a predetermined illuminance or higher is irradiated to a road surface around the vehicle 1 in a continuous annular shape surrounding the vehicle 1, in a top view of the vehicle 1.

According to the second light distribution pattern Q, since light is irradiated around the vehicle in the annular shape, pedestrians and obstacles or the like are hard to overlook. Meanwhile, the "annular shape" includes a circular annular shape, an elliptical annular shape, a rectangular annular shape, and the like.

The second light distribution pattern Q irradiates light at a position at least 50 cm away from an outer edge of the vehicle 1, in a top view of the vehicle 1. In this way, it is possible to illuminate foot of a user descending from the vehicle 1 or to confirm obstacles in the vicinity of the vehicle 1.

The second light distribution pattern Q irradiates light having a predetermined illuminance or higher to a road surface around the vehicle 1 in a continuous annular shape surrounding the vehicle 1 at least during the automatic driving mode. In this way, during the automatic driving mode, it is easy to confirm the presence and absence of pedestrians or obstacles around the side of the vehicle, and the vehicle control unit 3 can acquire information around the vehicle 1 with high accuracy The vehicular component according to the present embodiment is a vehicular component that includes the illumination device 4 provided on the roof part 30 included in the vehicle 1 and configured to cover a vehicle interior space from above. The illumination device 4 includes a light source unit (the light engine 100) and a light emitting unit (the light emitter 300). As shown in FIGS. 1A and 3, the light emitting unit (300) configured to emit light by the light emitted from the light source unit (the light engine 100) is provided along the outer peripheral edge 31 of the roof part 30 in a top view of the vehicle 1. Therefore, the light emitter 300 can easily irradiate light to the periphery of the vehicle 1 without the light being blocked by vehicle parts such as a door, a vehicle body frame and a vehicle body of the vehicle 1. In this way, the vehicular component according to the present embodiment is capable of favorably illuminating the periphery of the host vehicle 1.

In the vehicular component according to the present embodiment, a plurality of (four in the illustrated example) light emitters 300 are provided along the outer peripheral edge 31 of the roof part 30.

Therefore, the entire circumferences of the vehicle 1 can be efficiently irradiated by the light emitted from the plurality of light emitters 300.

Unlike the vehicular component according to the present embodiment, when attempting to illuminate the entire circumferences of the vehicle 1 by a single light emitter, it is required to devise a structure such as the shape of a projection lens of the light emitter, and it is difficult to realize such a structure.

However, according to the vehicular component of the present embodiment, the surroundings of the vehicle 1 are divided into four regions of a right front region, a left front region, a right rear region, and a left rear region. Each of the regions is illuminated by the right front light emitter 300*a*, the left front light emitter 300*b*, the right rear light emitter 300*c*, and the left rear light emitter 300*d*, respectively. Therefore, each light emitter 300 can be configured with a simple structure, and the entire circumferences of the vehicle 1 can be efficiently illuminated.

In the vehicular component according to the present embodiment, as shown in FIGS. 1B and 7B, the strip-like light emitter 300 extends along the outer peripheral edge 31 of the roof part 30.

The strip-like light emitter 300 can collectively irradiate light to a relatively large area around the vehicle 1. Unlike the vehicular component of the present embodiment, a wide area can be illuminated with a small number of light emitters 300, as compared with the case where the region around the vehicle is divided into a plurality of areas in the circumferential direction and each area is illuminated with the light emitter.

In the vehicular component according to the present embodiment, as shown in FIG. 1B, at least a part of the upper edge 33 of the vehicle 1 is configured by the light emitter 300.

According to the vehicular component of the present embodiment, since at least a part of the upper edge 33 of the vehicle 1 is configured by the light emitter 300 in a side view of the vehicle 1, the light emitted from the light emitter 300 is hardly blocked by the vehicle part.

In the vehicular component according to the present embodiment, as shown in FIG. 1A, the light engine 100 is provided on the side of the center portion 32 of the roof part 30 with respect to the light emitter 300 in a top view of the vehicle 1. The light guide 200 is provided between the light engine 100 and the light emitter 300. The light guide 200 guides the light emitted from the light engine 100 to the light emitter 300.

In the vehicular component according to the present embodiment, only the light emitter 300 is provided at the outer peripheral edge 31 of the roof part 30, and the light engine 100 is provided on the side of the center portion 32 of the roof part 30. Therefore, in a top view of the vehicle 1, the area of the roof part 30 can be efficiently used. For example, unlike the present embodiment, when the light engine is provided at the outer peripheral edge 31 of the roof part 30, it is necessary to secure an area for mounting the light engine in the area of the outer peripheral edge 31, in addition to an area for mounting the light emitter. However, according to the present embodiment, it is not necessary to secure an area for mounting the light engine 100 in the outer peripheral edge 31. Therefore, the light emitter 300 can be made larger by using that area, so that the side of the vehicle is brightly illuminated and is easily visually recognized. Further, it is possible to improve the design of the vehicle 1 by devising the shape of the light emitter 300.

In the vehicular component according to the present embodiment, the light emitter 300 allows light to be emitted downward.

According to the vehicular component of the present embodiment, it is easy to make it difficult for the light emitted from the light emitter 300 to enter the driver's eyes of other vehicles, so that glare to other vehicles can be suppressed In the vehicular component according to the present embodiment, the light emitter 300 is provided above any light emitting unit of the headlamp 21, a brake lamp 22 and a turn signal lamp 23. The light emitting unit is a portion that allows light emitted from the light source to be emitted to the outside. For example, the light emitting unit corresponds to an inner lens, an outer cover or an outer lens of each lamp.

Since the illumination device 4 is provided at a relatively high position of the vehicle 1, the illumination device 4 is easily visually recognized from other vehicles. Further, when the illumination device 4 is configured to illuminate a road surface around the vehicle 1, it is easy to make it difficult for the light emitted from the light emitter 300 to enter the driver's eyes of other vehicles, so that glare to other vehicles can be suppressed.

The vehicle 1, on which the vehicular component according to the present embodiment is mounted, is the vehicle 1 capable of travelling in the automatic driving mode, and the light emitter 300 emits light during the automatic driving mode.

In the vehicle 1 according to the present embodiment, light is irradiated to the surroundings of the vehicle 1 during the automatic driving mode. Therefore, during the automatic driving mode, it is easy to confirm the presence and absence of other vehicles, pedestrians or obstacles around the host vehicle 1, so that the vehicle control unit 3 can acquire information around the host vehicle 1 with high accuracy.

Meanwhile, as shown in FIG. 1B, it is preferable that the light emitter 300 of the illumination device 4 is provided above an upper edge of a windshield 24, and the light emitter 300 irradiates light downward. Even when the light emitter 300 is located above the height of the driver's eyes of other vehicles, the light emitted from the light emitter 300 hardly enters the driver's eyes of other vehicles and glare to other vehicles is suppressed since the light emitter 300 allows light to be emitted downward.

Meanwhile, unlike the above example, a light emitter 500 of the illumination device 4 may be provided below a lower edge of the windshield 24, as indicated by a broken line in FIGS. 1A and 1B. Glare to other vehicles can be more reliably suppressed.

Second Embodiment

Next, a vehicle 1A on which a vehicular component according to a second embodiment of the disclosure is mounted will be described with reference to FIGS. 11 and 12. The vehicle 1A of the second embodiment is different from the vehicle 1 of the first embodiment described above only in the illumination device. Therefore, only the illumination device will be described.

Figure 11:
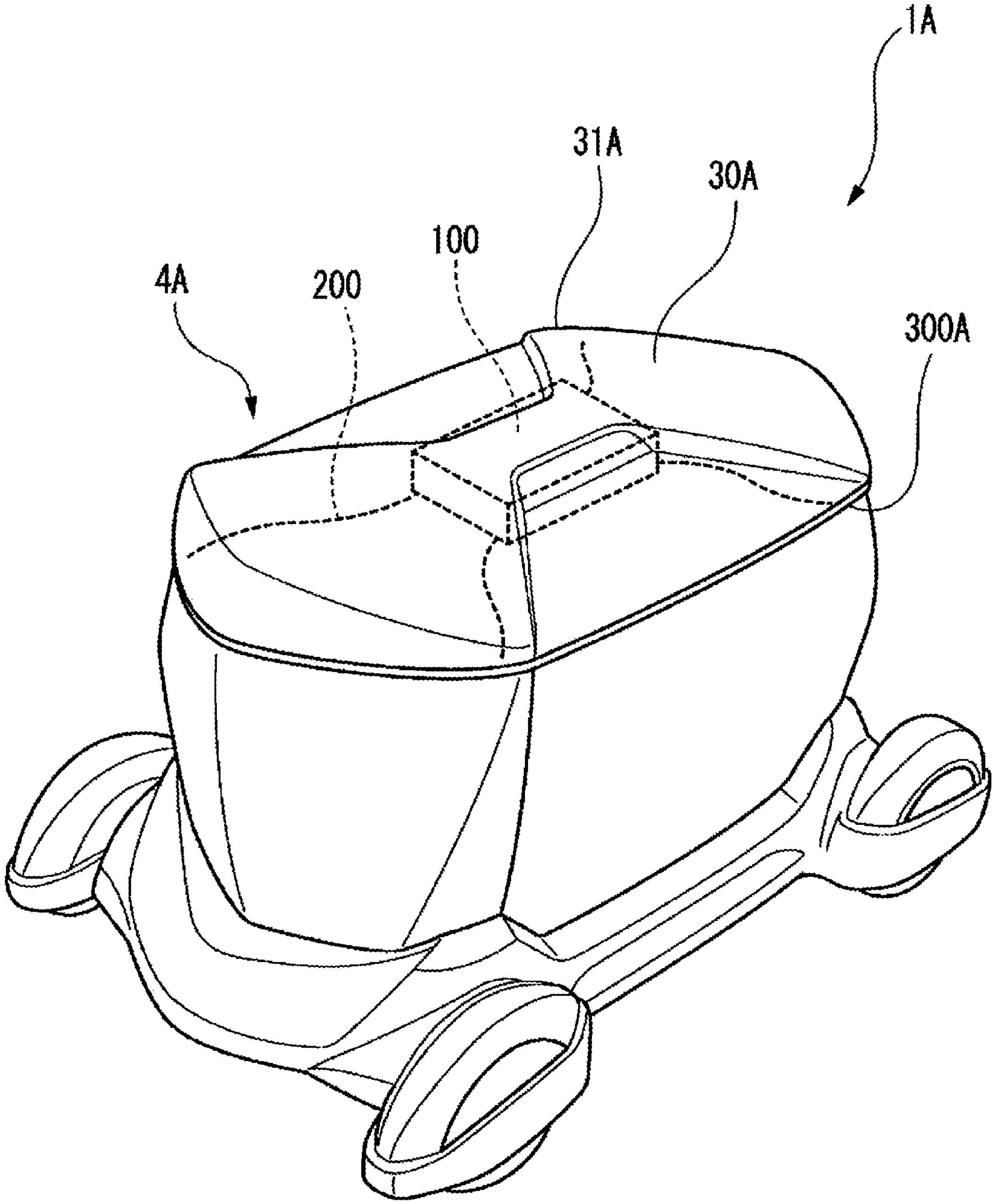
FIG. 11 is a perspective view of a vehicle according to a second embodiment of the disclosure.
Figure 12:
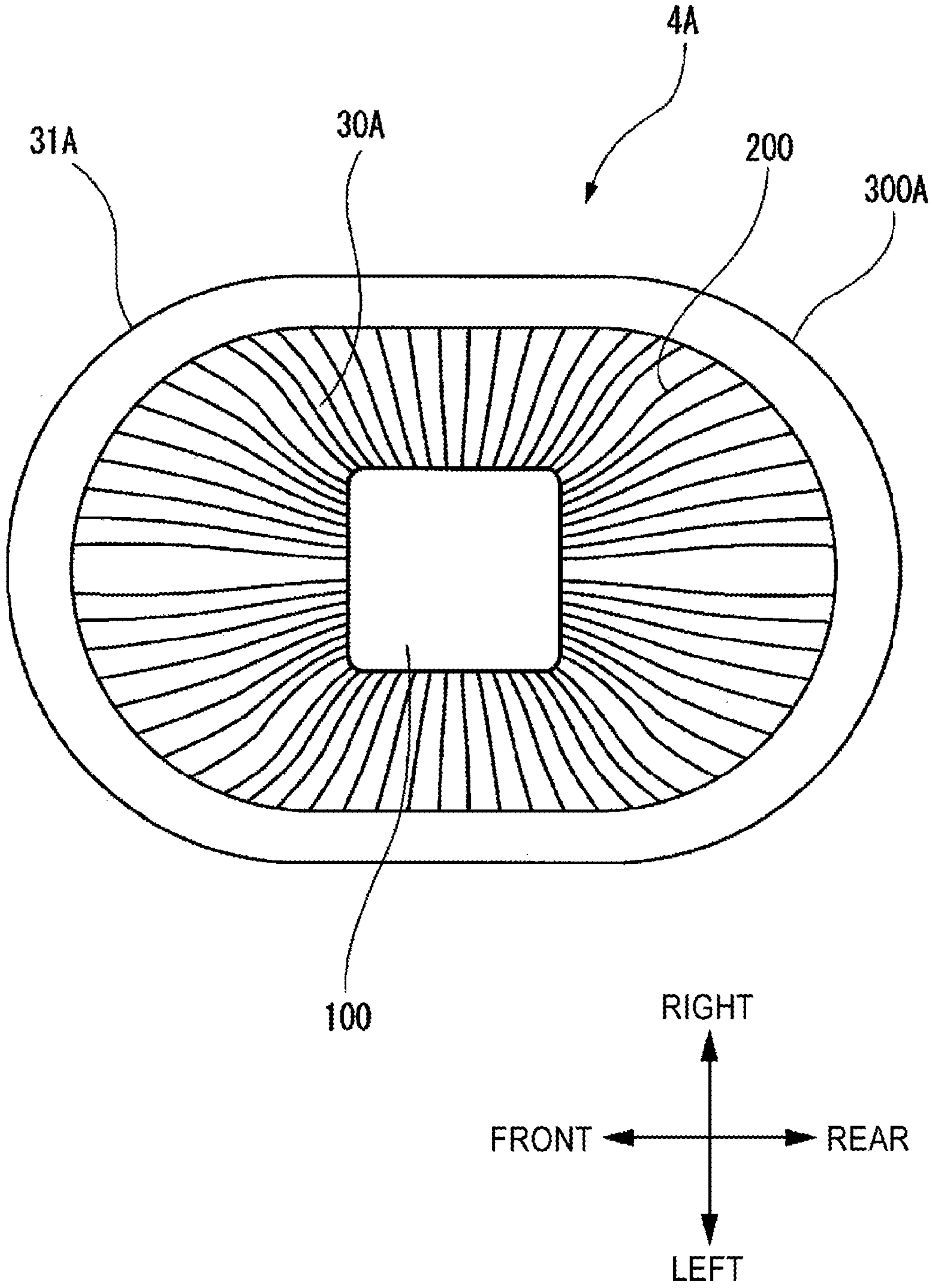
FIG. 12 is a top view of an illumination device mounted on the vehicle according to the second embodiment of the disclosure.

FIG. 11 is a perspective view of the vehicle 1A according to the second embodiment of the disclosure. FIG. 12 is a top view of an illumination device 4A which is mounted on the vehicle 1A according to the second embodiment of the disclosure. As shown in FIG. 11, a light emitter 300A may have an annular shape bordering an outer peripheral edge 31A of a roof part 30A of the vehicle 1A.

As shown in FIG. 11, the illumination device 4A includes the light engine 100, the light guide 200, and the light emitter 300A. Since the configurations of the light engine 100 and the light guide 200 are similar to those of the first embodiment, description thereof will be omitted.

The light emitter 300A has an annular shape bordering the outer peripheral edge 31A of the roof part 30A of the vehicle 1A. In a top view of the vehicle 1A, the outer peripheral edge 31A of the roof part 30A of the vehicle 1A is configured by an outer edge of the light emitter 300A. A plurality of optical fibers 201 constituting the light guide 200 is respectively connected to the annular light emitter 300A at intervals in the circumferential direction. In this way, the entire of the light emitter 300A extending along the outer peripheral edge 31A of the roof part 30A can be made to emit light.

For example, it is possible to adopt a configuration in which emission end faces of a plurality of light guides 200 and a plurality of projection lenses are provided in a single lamp chamber formed by a single housing and a single outer cover of the light emitter 300A.

In the illumination device 4A according to the present embodiment, the illumination device 4A has an annular shape bordering the outer peripheral edge 31A of the roof part 30A in a top view of the vehicle 1A.

According to the illumination device 4A of the present embodiment, it is easy to illuminate an annular area continuously surrounding the periphery of the vehicle 1A. In this way a user of the host vehicle 1A or a camera mounted on the host vehicle 1A is more likely to acquire information around the vehicle 1A.

In the illumination device 4A according to the present embodiment, the light emitter 300A has an annular shape bordering an outer periphery of the roof part 30A in a top view of the vehicle 1A.

According to the illumination device 4A of the present embodiment, it is easy to illuminate an annular area continuously surrounding the periphery of the vehicle 1A. In this way, a user of the host vehicle 1A or a camera mounted on the host vehicle 1A is more likely to acquire information around the vehicle 1A.

Third Embodiment

Figure 13A:
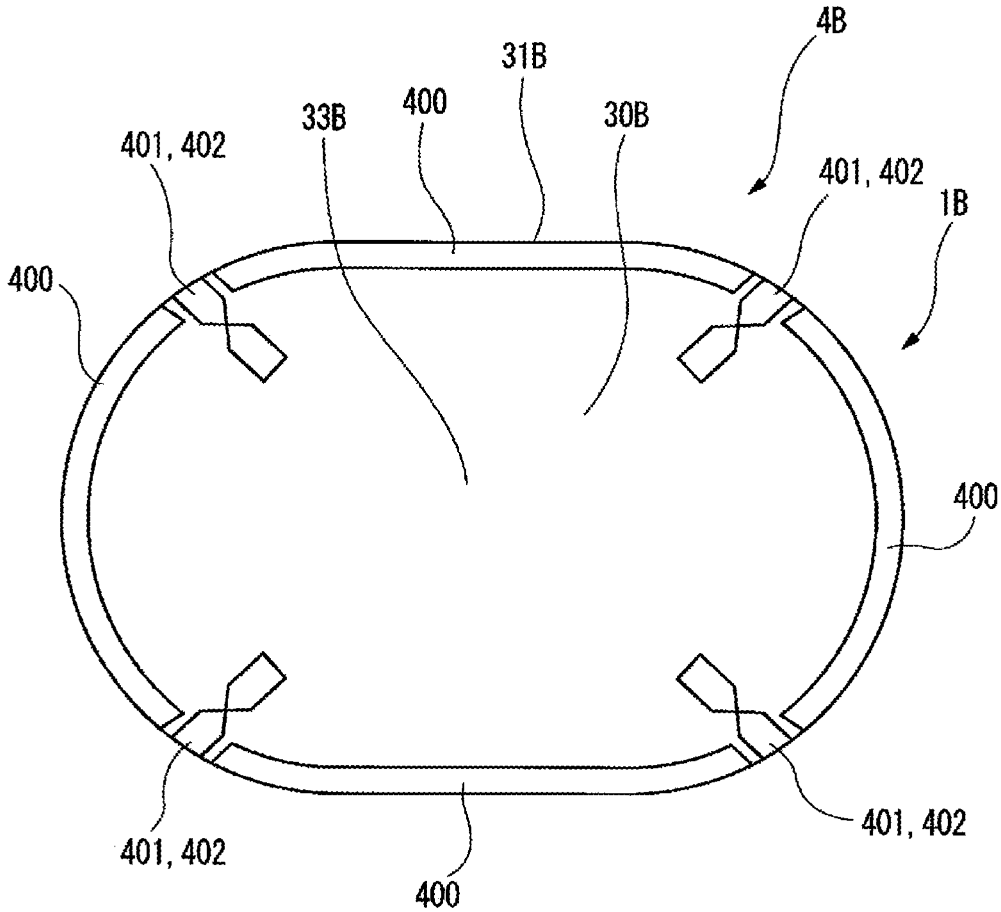
FIGS. 13A and 13B are views showing an illumination device mounted on a vehicle according to a third embodiment of the disclosure.
Figure 13B:
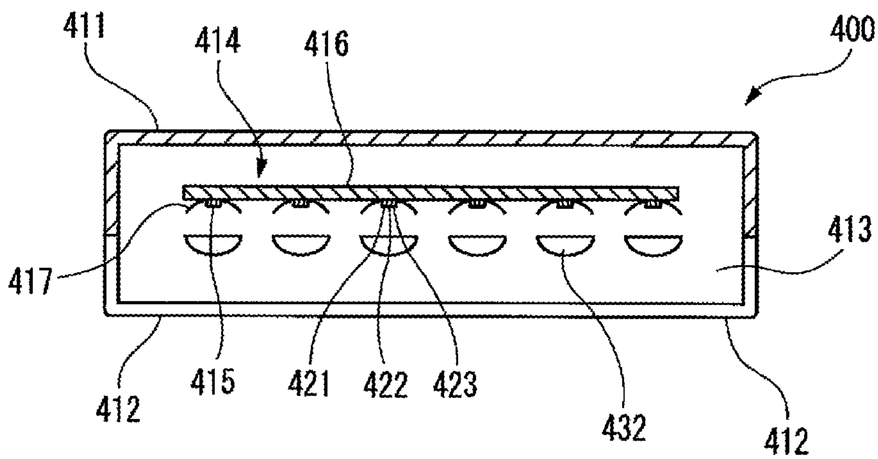

Next, an illumination device 4B of a vehicular component according to a third embodiment of the disclosure will be described with reference to FIG. 13. FIG. 13 is a view showing the illumination device 4B according to the third embodiment of the disclosure. FIG. 13A is a top view of the illumination device 4B according to the third embodiment. FIG. 13B is a sectional view of the illumination device 4B according to the third embodiment, taken along a horizontal plane in the vertical direction.

As shown in FIG. 13A, the illumination device 4B includes a plurality of light emitters 400 extending along an outer peripheral edge 31B of a roof part 30B of a vehicle 1B, a camera 401, and an infrared camera 402. The camera 401 and the infrared camera 402 are arranged alternately with the light emitter 400 along the outer peripheral edge 31B of the roof part 30B. In the present embodiment, unlike the first embodiment and the second embodiment described above, a light engine is not mounted on the center portion 33B of the roof part 30B.

As shown in FIG. 13B, the illumination device 4B according to the third embodiment of the disclosure includes a housing 411, and an outer cover 412 (an example of the light emitting unit) forming a lamp chamber 413 together with the housing 411. A light source unit 414 (an example of the light source unit), a plurality of reflectors 417, and a plurality of lenses 432 are provided in the lamp chamber 413. The outer cover 412 emits light by the light emitted from the light source unit 414.

The housing 411 has an opening. The opening of the housing 411 is closed by the outer cover 412. The outer cover 412 can be formed of a light-transmitting resin or glass.

The light source unit 414 includes a plurality of LED chips 415, a light source substrate 416, and a plurality of reflectors 417. Each of the LED chips 415 includes a red LED light source 421, a green LED light source 422, and a blue LED light source 423. The plurality of LED chips 415 are mounted on the light source substrate 416.

The plurality of reflectors 417 are provided on optical paths of light emitted from the LED chips 415. The reflectors 417 reflect the light emitted from the LED chips 415 to the opening of the housing 411.

The illumination device 4B can emit light of a desired color by adjusting the currents supplied to the red LED light sources 421, the green LED light sources 422, and the blue LED light sources 423. The illumination device 4B can turn on or off only a specific portion of the illumination device 4B by turning on or off the LED chip 415 belonging to a specific area along the outer peripheral edge 31B of the roof part 30B.

In the vehicle 1B according to the present embodiment, at least one of the camera 401 configured to acquire an image around the vehicle 1B and the infrared camera 402 configured to acquire infrared information around the vehicle 1B is incorporated into the illumination device 4B.

As compared with the case where the camera 401, the infrared camera 402, and the illumination device 4B are respectively mounted on the vehicle 1B, it is possible to reduce the number of parts and provide the vehicle 1B having unified design while mounting the camera 401, the infrared camera 402 and the illumination device 4B.

In the vehicle 1B according to the present embodiment, the camera 401 or the infrared camera 402 are arranged alternately with the light emitter 400 along the outer peripheral edge 31B of the roof part 30B.

Since the camera 401 or the infrared camera 402 are arranged alternately with the light emitter 400 along the outer peripheral edge 31B of the roof part 30B of the vehicle 1B, a wide range of information around the vehicle 1B can be acquired by the camera 410 or the infrared camera 40.

Although the embodiments of the disclosure have been described above, it goes without saying that the technical scope of the disclosure should not be interpreted limitedly by the description of these embodiments. It will be understood by those killed in the art that these embodiments are merely examples and that various modifications can be made within the scope of the invention described in the claims. The technical scope of the disclosure should be determined on the basis of the scope of the invention described in the claims and its equivalent scope.

In this embodiment, the driving mode of the vehicle includes the fully automatic driving mode, the advanced driving support mode, the driving support mode, and the manual driving mode. However, the driving mode of the vehicle should not be limited to these four modes. The driving mode of the vehicle may include at least one of these four modes. For example, the driving mode of the vehicle may include only the fully automatic driving mode. In this case, the vehicular illumination device is configured to always display the information indicating the fully automatic driving mode toward the outside of the vehicle. On the other hand, the driving mode of the vehicle may include only the manual driving mode. In this case, the vehicular illumination device is configured to always display the information indicating the manual driving mode toward the outside of the vehicle.

Furthermore, the classification and display form of the driving mode of the vehicle may be appropriately changed in accordance with the laws and regulations pertaining to the automatic driving in each country. Similarly the definitions of “the fully automatic driving mode,” “the advanced driving support mode,” and “the driving support mode” described in the description of these embodiments are merely examples, and these definitions may be appropriately changed in accordance with the laws and regulations pertaining to the automatic driving in each country Meanwhile, the above-described illumination device may have the following functions of transmitting the conditions of a host vehicle to other vehicles or pedestrians or the like, in addition to the function of irradiating light in order to secure the field of view of an occupant of a vehicle.

- When abnormality occurs in a brake device, the illumination device enters a specific light emitting state and calls attention to other vehicles and pedestrians.
- When the host vehicle becomes in a state where it cannot communicate with other vehicles or surrounding infrastructure, the illumination device enters a specific light emitting state and calls attention to other vehicles and pedestrians.
- When abnormality occurs in a sensor such as a camera or a radar which supports the automatic driving, the illumination device enters a specific light emitting state and calls attention to other vehicles and pedestrians.
- When abnormality occurs in an occupant’s vital state, such as when an occupant is in a coma state, the illumination device enters a specific light emitting state and calls attention to other vehicles and pedestrians.
- When the capacity of a battery is decreased, such as when the capacity of a battery is lower than a predetermined lower limit value, the illumination device enters a specific light emitting state and calls attention to other vehicles and pedestrians.
- When a tire is punctured, the illumination device enters a specific light emitting state and calls attention to other vehicles and pedestrians.
- In a vehicle that is capable of switching various automatic driving modes such as automatic driving mode suitable for sunny weather/automatic driving mode suitable for rainy weather, or automatic driving mode when the vehicle travels at a relatively high speed/automatic driving mode when the vehicle travels at a speed lower than that, or automatic driving mode in which the vehicle promptly reacts according to driver’s intention/automatic driving mode aiming at lower fuel consumption than that, the illumination device enters a specific light emitting state according to the selected automatic driving mode.

Meanwhile, the specific light emitting state includes a case in which the color of light emitted from the illumination device is a specific color, a case in which the intensity of light emitted from the illumination device is a specific intensity, a case in which the period of light emitted from the illumination device is a specific period, and a case in which the light emitting area of the illumination device is a specific area, or the like.

Meanwhile, it is preferable that the illumination device irradiates green light.

Further, in the illumination device 4, the lifetime of the light emitting element such as a laser light source may be predicted on the basis of a current value and a voltage value of a lighting control circuit and the temperature and humidity inside the illumination device 4, and the illumination state (the turn on/off, the light emitting area, the illumination color, the blinking cycle and the luminous intensity) of the illumination device 4 may be changed on the basis of the predicted lifetime. For example, when it is predicted that the lifetime of the light emitting element is shorter than a predetermined time (e.g., the predicted lifetime is 100 hours or less), the illumination device 4 may set the illumination color to a first illumination color (e.g., red). Further, when the predicted lifetime of the light emitting element is within a predetermined time range (e.g., the predicted lifetime is in the range from 100 hours to 500 hours), the illumination device 4 may set the illumination color to a second illumination color (e.g., yellow). Furthermore, when it is predicted that the predicted lifetime of the light emitting element is longer than a predetermined time (e.g., the predicted lifetime is 500 hours or more), the illumination device 4 may set the illumination color to a third illumination color green). Meanwhile, instead of the illumination device 4, the vehicle control unit 3 may predict the lifetime of the light emitting element. In this case, the illumination device 4 may receive data indicating the predicted lifetime from the vehicle control unit 3 and then change the illumination state of the illumination device 4 based on the received data.

Here, a temperature sensor configured to measure the internal temperature of the illumination device 4 and a humidity sensor configured to measure the internal humidity of the illumination device 4 may be provided inside the illumination device 4.

Next, an example of predicting the lifetime of the light emitting element based on the internal temperature of the illumination device 4 will be described below. In this case, a lifetime prediction formula indicating the relationship between a use time t of the light emitting element and a luminance L of the light emitting element may be stored in a memory of the illumination device 4. A processing device mounted on the illumination device 4 may determine the predicted lifetime based on the lifetime prediction formula and the current luminance L of the light emitting element. Further, the lifetime prediction formula stored in the memory may be acquired from a server arranged on a communication network via the wireless communication unit 10. In this case, the illumination device 4 may periodically acquire the updated lifetime prediction formula from the server arranged on the communication network. For example, when the lifetime prediction formula stored in the memory is a lifetime prediction formula based on the indoor temperature of 30 degrees and the internal temperature of the illumination unit 42 acquired from the temperature sensor is 50 degrees, the illumination device 4 may acquire the lifetime prediction formula based on the indoor temperature of 50 degrees from the server and then determine the predicted lifetime based on the acquired lifetime prediction formula based on the indoor temperature of 50 degrees and the current luminance L of the light emitting element. In this way, a suitable lifetime prediction formula can be acquired via the communication network, so that the lifetime can be predicted more accurately. Furthermore, since the illumination device 4 changes its illumination state in accordance with the predicted lifetime, it is possible to present the information relating to the lifetime of the light emitting element toward the outside of the vehicle. In this manner, pedestrians or the like existing outside the vehicle can grasp the lifetime of the illumination device 4 by visually recognizing the illumination state of the illumination device 4.

Further, the illumination device 4 may change its illumination state (the turn on/off, the light emitting area, the illumination color, the blinking cycle and the luminous intensity) based on the current condition of a driver. For example, in the case where one of the plurality of cameras 6 is configured to capture the driver, the vehicle control unit 3 may acquire the captured image of the driver from the camera 6 and then determine the current condition of the driver based on the acquired captured image and a face recognition algorithm. Here, when it is determined that the driver cannot drive (e.g., when it is determined that the driver is dozing), the vehicle control unit 3 generates a predetermined illumination control signal and then transmits the predetermined illumination control signal to the illumination device 4. In the illumination device 4, the illumination color of the illumination device 4 may be set to a predetermined illumination color (e.g., red) based on the predetermined illumination control signal. In this manner, it is possible to present the information relating to the current condition of the driver toward the outside of the vehicle.

Further, in this embodiment, an example where the illumination state of the illumination device 4 is changed in accordance with the driving mode of the vehicle 1 has been described. However, instead of the illumination device 4 or in addition to the illumination device 4, the sound outputted from a speaker (not shown) may be changed in accordance with the driving mode of the vehicle 1. For example, the speaker may be installed at a predetermined position of the vehicle so as to output the sound indicating the motion mode of the vehicle 1 toward the outside of the vehicle. In this case, a speaker control unit (not shown) configured to control the speaker may store the data relating to the pitch, magnitude, rhythm, voice, melody and voice guidance content or the like of the sound indicating the motion mode of the vehicle 1. For example, the pitch, magnitude, rhythm, voice, melody and voice guidance content or the like of the sound outputted from the speaker may be changed in accordance with the driving mode of the vehicle 1. The speaker control unit receives a mode signal indicating the driving mode of the vehicle 1 from the vehicle control unit 3 and then determines the sound to be outputted to the speaker in accordance with the received mode signal. Thereafter, the speaker control unit outputs the determined sound to the speaker. By using the speaker in this way, the information indicating the driving mode of the vehicle 1 can be presented to pedestrians or other vehicles or the like existing outside the vehicle.

The present application is based on Japanese Patent Application (Patent Application No. 2015-211223) filed on Oct. 27, 2015, Japanese Patent Application (Patent Application No. 2015-211224) filed on Oct. 27, 2015, and Japanese Patent Application (Patent Application No. 2015-211225) filed on Oct. 27, 2015, the contents of which are appropriately incorporated herein.

INDUSTRIAL APPLICABILITY

According to the disclosure, the vehicular component and the vehicle which include the illumination device capable of favorably illuminating the periphery of the host vehicle are provided.

DESCRIPTION OF REFERENCE NUMERALS

1: Vehicle, 2: Vehicle System, 3: Vehicle Control Unit, 4, 4A, 4B: Illumination Device (Vehicular Illumination Device), 5: Sensor, 6: Camera, 7: Radar, 8: HMI, 9: GPS, 10: Wireless Communication Unit, 10A: Vehicle Body Roof, 11: Map Information Storage Unit, 12: Steering Actuator, 13: Steering Device, 14: Brake Actuator, 15: Brake Device, 16: Accelerator Actuator, 17: Accelerator Device, 21: Headlamp, 22: Brake Lamp, 23: Turn Signal Lamp, 24: Windshield, 30: Roof Part, 31: Outer Peripheral Edge, 32: Central Portion, 33: Upper Edge, 100: Light Engine (an example of Light Source Unit), 111: Case, 112: Support Plate, 113: Projection 114: Aiming Screw, 115: Heat Sink, 116: Light Source Substrate, 120: Light Source Unit, 121: First Laser Light Source, 122: Second Laser Light Source, 123: Third Laser Light Source, 124: Fourth Laser Light Source, 131: First Lens, 132: Second Lens, 133: Third Lens, 134: Fourth Lens, 135: Fifth Lens, 140: Collector, 141: First Dichroic Mirror, 142: Second Dichroic Mirror, 143: Third Dichroic Mirror, 144: Fourth Dichroic Mirror, 150: Reflection Unit, 151: Reflection Mirror, 152: Base, 152*a*: Opening, 152*b*: Side 152*c*: Side, 153: First Pivoting Body, 153*a*: Opening, 153*b*: Side, 153*c*: Side, 154: Second Pivoting Body, 155: First Torsion Bar, 156: Second Torsion Bar, 157: First Permanent Magnet, 158: Second Permanent Magnet, 159: Terminal Part, 190: Light Engine Control Unit, 200: Light Guide, 201: Optical Fiber, 202: Incident End Face, 203: Emission End Face, 300: Light Emitter (an example of Light Emitting Unit), 300*a*: Right Front Light Emitter, 300*b*: Left Front Light Emitter, 300*c*: Right Rear Light Emitter, 300*d*: Left Rear Light Emitter, 301: Housing, 302: Outer Cover, 303: Lamp Chamber, 304: Projection Lens, 400: Light Emitter, 401: Camera, 402: Infrared Camera, 411: Housing 412: Outer Cover, 413: Lamp Chamber, 414: Light Source Unit (an example of Light Source Unit), 415: LED Chip, 416: Light Source Substrate, 417: Reflector, 421: Red LED Light Source, 422: Green LED Light Source, 423: Blue LED Light Source, 431: Reflector, 432: Lens, P: First Light Distribution Pattern, P1: First Mode, P2: Second Mode, Q: Second Light Distribution Pattern, HR: Horizontal Line

The invention claimed is:

1. A vehicular component comprising an illumination device installed on a roof part included in a vehicle and configured to cover a vehicle interior space from above, wherein the illumination device includes a light source unit and one or more light emitting unit, wherein the one or more light emitting unit is configured to emit visible light by light emitted from the light source unit and is provided along each of the outer peripheral edges of the roof part in a top view of the vehicle, wherein the illumination device irradiates visible light having a predetermined illuminance or higher towards a road surface of two or more lanes laterally away from a traveling lane of a host vehicle in at least one side of the left and right direction of the traveling lane while the host vehicle continues to travel in the traveling lane, wherein the vehicle is capable of travelling in an automatic driving mode, wherein the one or more light emitting unit is configured to be turned on during the automatic driving mode, wherein in a top view of the vehicle, the light source unit is provided on the center side of the roof part with respect to the one or more light emitting unit, wherein a plurality of light guide members are provided at intervals in the circumferential direction between the light source unit and the one or more light emitting unit, and wherein the plurality of light guide members guide the light emitted from the light source unit provided on the center side of the roof part to the one or more light emitting unit provided at each of the outer peripheral edges of the roof part.

2. The vehicular component according to claim 1, wherein the one or more light emitting unit comprises a plurality of light emitting units provided along the outer peripheral edge of the roof part.

3. The vehicular component according to claim 1, wherein the each of the one or more light emitting unit comprises a strip shape that extends along the outer peripheral edge of the roof part.

4. The vehicular component according to claim 1, wherein in a side view of the vehicle, at least a part of an upper edge of the vehicle is formed by the one or more light emitting unit.

5. The vehicular component according to claim 1, wherein in a top view of the vehicle, the illumination device has an annular shape bordering the outer peripheral edge of the roof part.

6. The vehicular component according to claim 1, wherein in a top view of the vehicle, the one or more light emitting unit has an annular shape bordering the outer peripheral edge of the roof part.

7. The vehicular component according to claim 1, wherein the one or more light emitting unit is configured to emit light downward.

8. The vehicular component according to claim 1, wherein at least one of a camera configured to acquire an image around the vehicle and an infrared sensor configured to acquire infrared information around the vehicle are incorporated into the illumination device.

9. The vehicular component according to claim 8, wherein the camera or the infrared sensor are arranged alternately with the at least one light emitting unit along the outer peripheral edge of the roof part.

10. A vehicle comprising the vehicular component according to claim 1, wherein the one or more light emitting unit of the illumination device is provided above any light emitting unit of a headlamp, a brake lamp and a turn signal lamp.

11. A vehicular component comprising an illumination device, wherein when, in a virtual cylindrical screen vertically provided at a position 20 m away from a center of the vehicle, a front center of the vehicle is set to 0 degree, a rear center of the vehicle is set to 180 degrees, and an angle is defined so that the angle increases from the front center of the vehicle toward a driver' seat side, and wherein the illumination device is configured to irradiate light from the light source units along at least three of the outer peripheral edges having a predetermined illuminance or higher downward than a horizontal line toward at least an area from 20 degrees to 135 degrees, wherein the illumination device is capable of being switched between a first mode in which light having a predetermined illuminance or higher is irradiated downward than the horizontal line toward an area from 180 degrees to 340 degrees and a second mode in which light having a predetermined illuminance or higher is irradiated downward and upward than the horizontal line toward the area from 180 degrees to 340 degrees, and wherein the illumination device switches between the first mode and the second mode by rotating a reflection unit positioned within the illumination device.

12. The vehicular component according to claim 11, wherein the illumination device irradiates light having a predetermined illuminance or higher toward a road surface of two or more lanes laterally away from a travelling lane of a host vehicle.

13. The vehicular component according to claim 11, wherein the illumination device irradiates light having a predetermined illuminance or higher downward than the horizontal line toward at least the area from 20 degrees to 135 degrees at least during the automatic driving mode.

14. A vehicular component comprising an illumination device, wherein the illumination device is configured to irradiate light having a predetermined illuminance or higher onto a road surface around a vehicle in a continuous annular shape surrounding the vehicle, in a top view of the vehicle, wherein the illumination device may irradiate light at a position at least 50 cm away from an outer edge of the vehicle, in a top view of the vehicle, wherein the illumination device includes a light emitter, and wherein the light emitter has a continuous annular shape surrounding the vehicle, in the top view of the vehicle.

15. A vehicle comprising the vehicular component according to claim 14, wherein the illumination device irradiates light having a predetermined illuminance or higher toward a road surface around the vehicle in a continuous annular shape surrounding the vehicle at least during the automatic driving mode of the vehicle.

16. A vehicle comprising the vehicular component according to claim 14, wherein the light emitting unit of the illumination device is provided below a lower edge of a windshield.

17. A vehicle comprising the vehicular component according to claim 14, wherein the light emitting unit of the illumination device is provided above an upper edge of a windshield, and wherein the light emitting unit irradiates light downward.

* * * * *